United States Patent
Budman et al.

(10) Patent No.: US 12,192,197 B2
(45) Date of Patent: Jan. 7, 2025

(54) PROXIMITY BASED IDENTITY MODULATION FOR AN IDENTITY VERIFICATION SYSTEM

(71) Applicant: TruU, Inc., Palo Alto, CA (US)

(72) Inventors: Lucas Allen Budman, Denver, CO (US); Amitabh Agrawal, Superior, CO (US); Oleksandr Rodak, Parker, CO (US); Andrew Weber Spott, Boulder, CO (US)

(73) Assignee: TruU, Inc., Palo Alto, CA (US)

( * ) Notice: Subject to any disclaimer, the term of this patent is extended or adjusted under 35 U.S.C. 154(b) by 510 days.

(21) Appl. No.: 17/542,289

(22) Filed: Dec. 3, 2021

(65) Prior Publication Data
US 2022/0179982 A1    Jun. 9, 2022

Related U.S. Application Data

(60) Provisional application No. 63/121,854, filed on Dec. 4, 2020, provisional application No. 63/121,855, filed on Dec. 4, 2020.

(51) Int. Cl.
*H04L 9/40*     (2022.01)
*G06F 3/01*     (2006.01)
*G06F 21/32*    (2013.01)
*G06F 21/62*    (2013.01)

(52) U.S. Cl.
CPC .......... *H04L 63/0861* (2013.01); *G06F 3/011* (2013.01); *G06F 3/017* (2013.01); *G06F 21/32* (2013.01); *G06F 21/62* (2013.01); *H04L 63/083* (2013.01); *H04L 63/0876* (2013.01); *H04L 63/107* (2013.01); *H04L 63/1416* (2013.01); *H04L 63/1433* (2013.01); *H04L 63/20* (2013.01)

(58) Field of Classification Search
CPC .............. H04L 63/0861; H04L 63/083; H04L 63/0876; H04L 63/107; H04L 63/1416; H04L 63/1433; H04L 63/20; G06F 3/011; G06F 3/017; G06F 21/32; G06F 21/62
See application file for complete search history.

(56) References Cited

U.S. PATENT DOCUMENTS

2005/0097320 A1    5/2005   Golan et al.
2013/0227651 A1    8/2013   Schultz et al.
(Continued)

FOREIGN PATENT DOCUMENTS

WO    WO-2019143360 A1 *   7/2019
WO    WO-2019221325 A1 *   11/2019   ............. G06F 21/32

*Primary Examiner* — Hee K Song
(74) *Attorney, Agent, or Firm* — Fenwick & West LLP

(57) ABSTRACT

An identity verification system receives a candidate signal transmitted from a computing device located near a secured asset in response to a target user requesting access to the secure asset. The identity verification system compares the candidate signal to a cluster of signals measured during past successful authentications by the computing device to determine a modulation factor and determines a match probability for the target user based on the determined modulation factor. The identity verification system grants the requesting target user access to the secured asset in response to determining that the match probability is greater than the operational security threshold.

18 Claims, 20 Drawing Sheets

(56) References Cited

U.S. PATENT DOCUMENTS

2014/0343943 A1* 11/2014 Al-Telmissani ........ G06F 21/32
                                                    704/246
2016/0301690 A1* 10/2016 Miller ................ H04W 72/542
2020/0285977 A1*  9/2020 Brebner ................ H04L 67/02

* cited by examiner

PROXIMITY BASED IDENTITY MODULATION FOR AN IDENTITY VERIFICATION SYSTEM

CROSS REFERENCE TO RELATED APPLICATIONS

This application claims the benefit of U.S. Provisional Patent Application No. 63/121,854, filed on Dec. 4, 2020, and U.S. Provisional Patent Application No. 63/121,855, filed on Dec. 4, 2020, both of which are incorporated by reference herein in their entirety for all purposes.

TECHNICAL FIELD

This disclosure relates generally to techniques for user identification, and more specifically to techniques for authenticating a user requesting access to a secured asset.

BACKGROUND

Physical and digital security systems rely on technologies and techniques that are antiquated in today's world. In the digital world, passwords only prove that an individual knows a password. In the physical world, access cards only prove that an individual has an access card or was able to make a copy of the access card. Despite their widespread implementation, such techniques represent a security hole in the modern world. Whether physical or digital, these constructs have been put in place to make access control decisions by confirming a person's identity at a given time. However, these systems create several security problems. First, while a password or a security card function as a proxy for a user's identity, neither validates that the person using the password (and/or card) is in fact the user to whom the identity belongs. Second, passwords or security cards can be easily compromised. For example, a user may guess another user's password or duplicate or steal another user's security card. Additionally, once access has been granted based on receipt of a password or security card, access is often granted for a longer period of time than is appropriate for an average user.

Although security techniques have been developed to address these problems, existing techniques are still unable to address the problems described above. Multi-Factor Authentication techniques may increase the difficulty required to impersonate another user, but they are still unable to validate a user's identity. Smart Cards may replace a username or password with a physical card and a PIN, but a user impersonating another user need only have their card and know their PIN to be granted access. Moreover, these techniques add additional implementation challenges, for example requiring users to carry additional security cards that are not practical for mobile users and requiring that physical access points be outfitted with compatible card reading technologies. Conventional biometric systems are very expensive and difficult to implement and are not designed to improve the convenience with which a user may be granted access. Moreover, these systems still often rely on a back-up password which can be stolen or guessed by another user.

Additionally, security systems often grant access to different individuals under varying conditions, for example to perform different tasks or to enter at certain times during the day. Such variable conditions may be role-dependent in that individuals with different roles may be subject to varying session timeouts and/or different authentication requirements, for example password authentication, biometric authentication, or a combination thereof. Alternatively, the conditions may be context-dependent in that they depend on the situation under which a user attempts to gain access, for example different authentication requirements for different times of the week or day or different authentication requirements for employees versus visitors of an enterprise. An effectively integrated digital security system respects a set of risk tolerances established by the integrated enterprise system by providing authentication mechanisms of ranging strengths. However, technical constraints of conventional multi-factor authentication system prevent such seamless integration from being achieved.

BRIEF DESCRIPTION OF DRAWINGS

The disclosed embodiments have other advantages and features which will be more readily apparent from the detailed description, the appended claims, and the accompanying figures (or drawings). A brief introduction of the figures (or drawings). A brief introduction of the figures is below.

DETAILED DESCRIPTION

Figure 1:
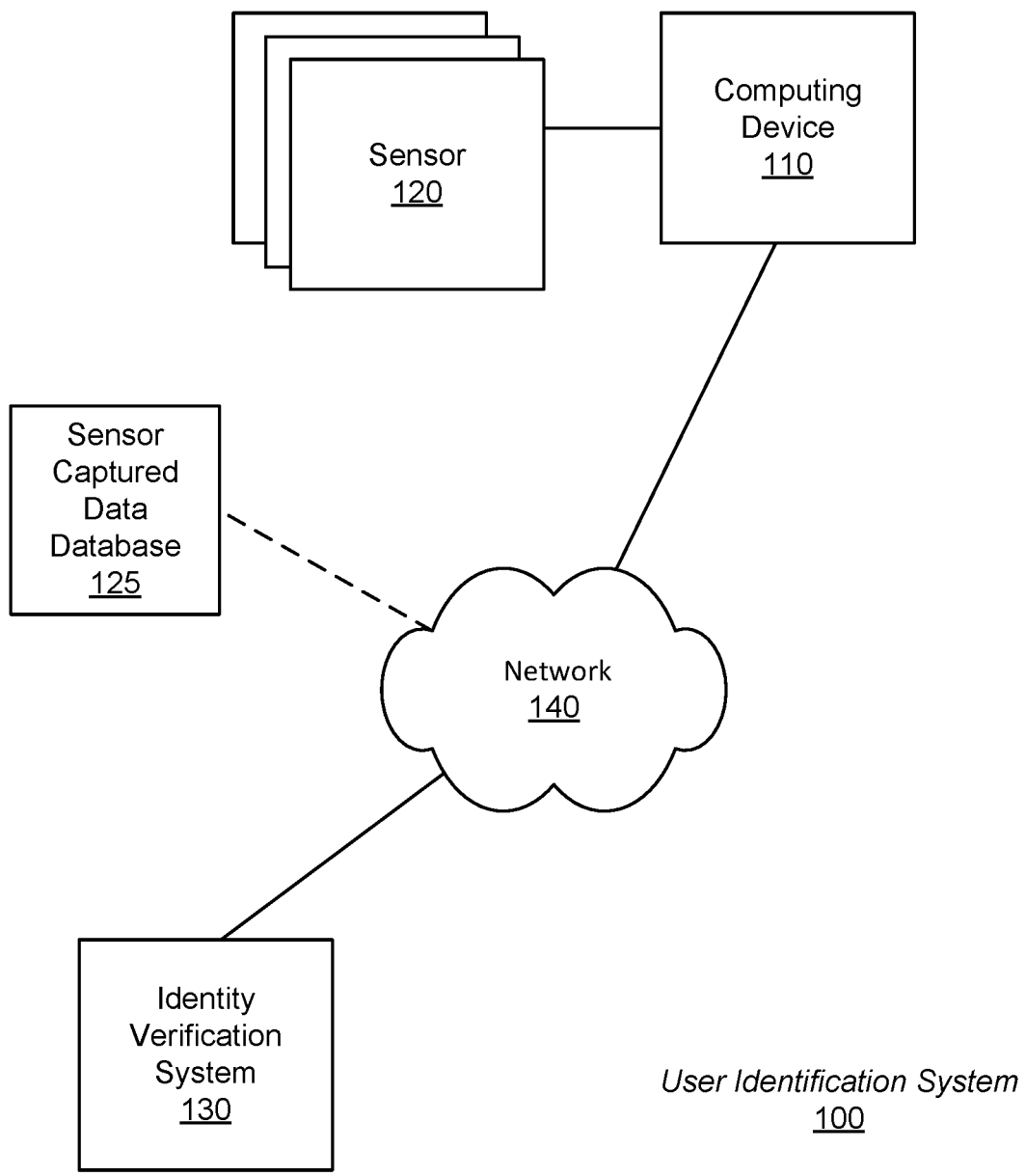
FIG. 1 illustrates one embodiment of an identification system for identifying a user based on sensor captured data which includes motion information characterizing the user, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Embodiments of a user identification system determine the identity of a user based on characteristic data received from a plurality of sources, for example using data collected by an accelerometer or gyroscope on a user's mobile device. The data may be collected using one or more of the following: cameras, motion sensors, global positioning system (GPS), WiFi (SSID/BSSID, signal strength, location, if provided), and multitude of other sensors capable of recording characteristic data for a user.

As described herein, characteristic data collected for a user refers to both motion data and/or non-motion data. In addition to visual characteristics, individuals may be characterized with particular movements and motion habits. Accordingly, motion data, as described herein, describes not only a particular movement by a user, but also additional considerations, for example the speed at which the motion occurred, or the various habits or tendencies associated with the motion. By identifying one or a combination of particular movements based on data captured by motion sensors the system may be able to identify a user from a population of users. In embodiments in which the system uses a combination of movements to identify a user, the user identification system operates under the assumption that each user is associated with a unique combination of motion data. Accordingly, a unique combination of motion data may be interpreted as a user's unique signature or identifier. For example, although two users may swing their arms while walking and holding their phone, each user swings their arms at a different rate or cadence. To generate the unique combination of interest, the user identification system may consider signals recorded from several sensors and/or a combination of several such signals. In some embodiments, the unique combination of motion data (or signature for a user) may be interpreted at a finer level of granularity than the above example.

As the user moves with their mobile device, motion sensors internally coupled to the device or communicatively coupled to the device (e.g., smartwatch or bracelet or pendant with sensors) record motion data. The user identification system applies a combination of machine-learned models, or in some embodiments, a single model to analyze the recorded motion. Accordingly, the user identification system, as described herein may verify a true (or actual) identity of a particular user (or individual) rather than merely confirming that a user has certain access credentials. When the mobile device is in motion, sensor data describing the motion of the phone is communicated to a server where human identification inference is performed.

In addition to motion data, the user verification system may also consider non-motion data; that is data which provides insight into the identity of a user independent of the movement or motions of the user. Non-motion data includes, but is not limited to biometric data (e.g., facial recognition information or a fingerprint scan), voice signatures, keyboard typing cadence, or data derived from other sources that do not monitor movement (e.g., Wi-Fi signals or Bluetooth signals).

Although techniques and embodiments described herein, may be described with reference to motion data, a person having ordinary skill in the art would recognize that those techniques and embodiments may be applied to motion data, non-motion data, or a combination therefore (more generally referred to as "characteristic data").

To that end, using machine-learning and statistical analysis techniques, the user verification system may classify continuously, or alternatively periodically, recorded characteristic data into particular movements. For each movement, the user verification system determines a user's identity and a confidence level in that identity. In implementations in which the identity is determined with a threshold level of confidence, the user is granted access to a particular operation. In some implementations, a user's identity may be determined based on information recorded from multiple sensors of sources. As described herein, a confidence level may include a probability level.

System Environment Example

FIG. 1 shows a user identification system 100 for identifying a user based on sensor captured data that includes movement information characterizing the user, according to one embodiment. The user identification system 100 may include a computing device 110, one or more sensors 120, an identity verification system 130, and a network 140. Although FIG. 1 illustrates only a single instance of most of the components of the identification system 100, in practice more than one of each component may be present, and additional or fewer components may be used.

A computing device 110, through which a user may interact, or other computer system (not shown), interacts with the identity verification system 130 via the network 140. The computing device 110 may be a computer system, for example, having some or all of the components of the computer system described with FIG. 13. For example, the computing device may be a desktop computer, a laptop computer, a tablet computer, a mobile device, or a smartwatch. The computing device 110 is configured to communicate with the sensor 120. The communication may be integrated, for example, one or more sensors within the computing device. The communication also may be wireless, for example, via a short-range communication protocol such as BLUETOOTH with a device having one or more sensors (e.g., a smartwatch, pedometer, bracelet with sensor(s)). The computing device 110 also may be configured to communicate with the identity verification system 130 via network 140.

With access to the network 140, the computing device 110 transmits motion data recorded by the sensor 120 to the identity verification system 130 for analysis and user identification. For the sake of simplicity, the computing device 110, is described herein as a mobile device (e.g., a cellular phone or smartphone). One of skill in the art would recognize that the computing device 110 may also include other types of computing devices, for example, a desktop computer, laptop computers, portable computers, personal digital assistants, tablet computer or any other device including computing functionality and data communication capabilities to execute one or more of the processing configurations described herein.

The one or more sensor 120 may be configured to collect motion data (direct and indirect) describing the movements of a user operating the computing device 110. As described herein, sensors 120 may refer to range of sensors or data sources, either individually or in combination, for collecting direct motion data (e.g., accelerometers, gyroscopes, GPS coordinates, etc.) or indirect motion data (e.g., Wi-Fi data, compass data, magnetometer data, pressure information/ barometer readings), or any other data recorded by a data source on or in proximity to the computing device 110. In alternate embodiments, the computing device 110 includes, but is not limited to, a computer mouse, a trackpad, a keyboard, and a camera.

The identity verification system 130 may be configured as a verification system that analyzes data and draws particular inferences from the analysis. For example, the identity verification system 130 receives motion data and performs a series of analyses to generate an inference that corresponds to an identity of a user associated with the motion data from a population of users. Generally, the identity verification system 130 is designed to handle a wide variety of data. The identity verification system 130 includes logical routines that perform a variety of functions including checking the validity of the incoming data, parsing and formatting the data if necessary, passing the processed data to a database server on the network 140 for storage, confirming that the database server has been updated, and identifying the user. The identity verification system 130 communicates, via the network 140, the results of the identification and the actions associated with the identification to the computing device 110 for presentation to a user via a visual interface.

It is noted that the disclosed configurations and processes of the identify verification system 130 are described herein with reference to motion data collected for a user. However, the disclosed principles of the identify verification system 130 may also be applied to authenticate a user using non-motion data, for example a manually entered password or biometric authentication data.

The network 140 represents the various wired and wireless communication pathways between the computing device 110, the identity verification system 130, and the sensor captured data database 125, which may be connected with the computing device 110 or the identity verification system 130 via network 140. Network 140 uses standard Internet communications technologies and/or protocols. Thus, the network 140 can include links using technologies such as Ethernet, IEEE 802.11, integrated services digital network (ISDN), asynchronous transfer mode (ATM), etc. Similarly, the networking protocols used on the network 140 can include the transmission control protocol/Internet protocol (TCP/IP), the hypertext transport protocol (HTTP), the simple mail transfer protocol (SMTP), the file transfer protocol (FTP), etc. The data exchanged over the network 140 can be represented using technologies and/or formats including the hypertext markup language (HTML), the extensible markup language (XML), a custom binary encoding etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above. In alternate embodiments, components of the identity verification system 130, which are further described with reference to FIGS. 2-12 and the sensor captured data database 125 may be stored on the computing device 110.

Identity Verification System Example

Figure 2:
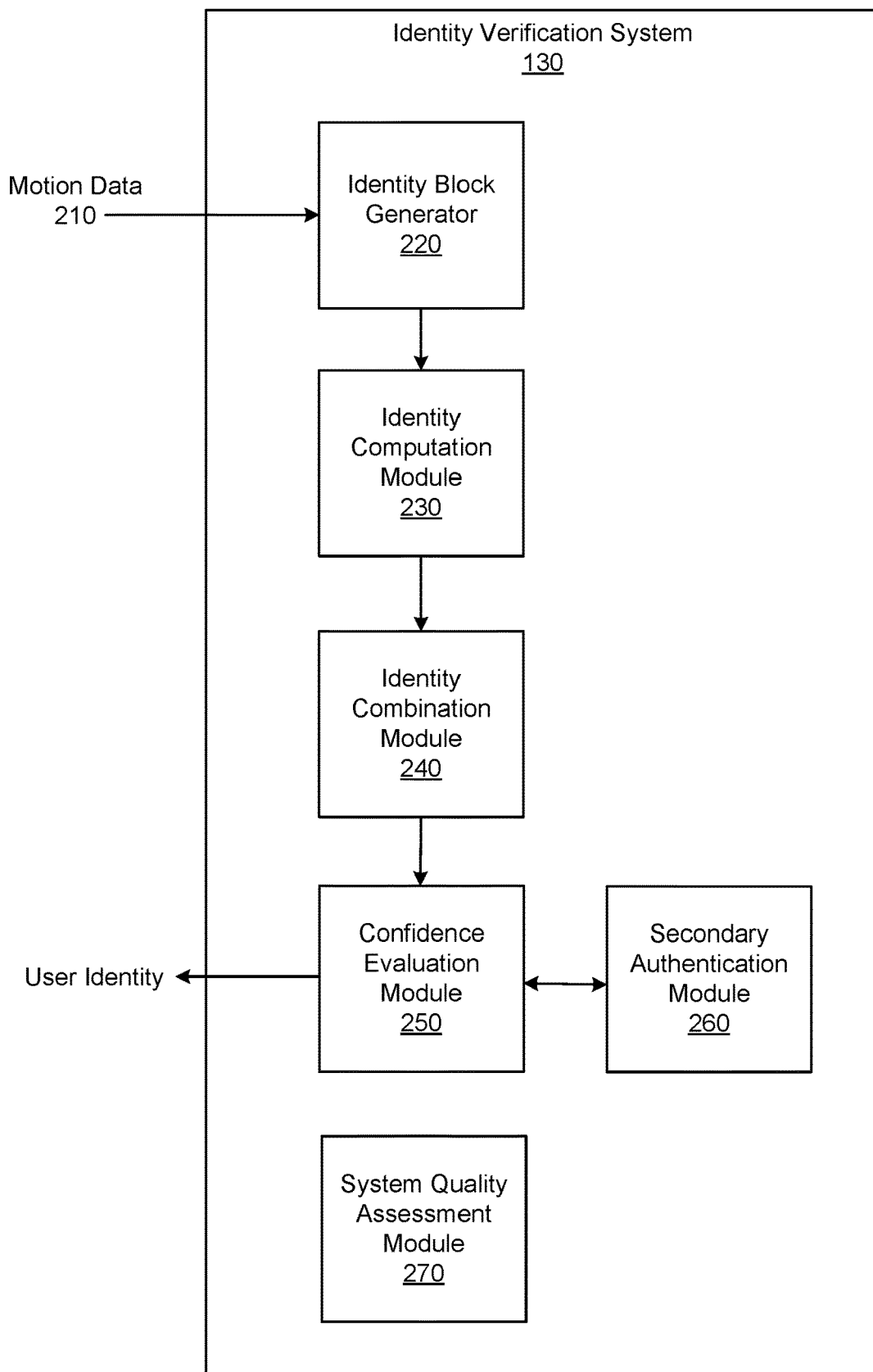
FIG. 2 is a block diagram of the system architecture of the identity verification system, according to one embodiment.

FIG. 2 is a block diagram of an example system architecture of the identity verification system 130, according to one embodiment. The identity verification system 130 may include an identity block generator 220, an identity computation module 230, an identity combination module 240, a confidence evaluation module 250, a secondary authentication module 260, and a system quality assessment module 270. In some embodiments, the identity verification system 130 includes additional modules or components. Note that the reference to modules as used herein may be embodied and stored as program code (e.g., software instructions) and may be executable by a processor (or controller). The modules may be stored and executed using some or all of the components described in, for example, FIG. 15. Moreover, the modules also may be instantiated through other processing systems, for example, application specific integrated circuits (ASICs) and/or field programmable gate arrays (FPGAs), in addition to or in lieu of some or all of the components described with FIG. 15.

The identity block generator 220 receives motion data 210, or more broadly behavior data describing a user's actions over a period of time, from one or more different sources (e.g., motion data recorded directly by sensors configured with mobile devices, sensor data recorded indirectly from internet of Thing (JOT) sensors, and traditional enterprise system sources). As described herein, an enterprise system is an entity with infrastructure for keeping data secure (e.g., a security system of a physical building or digital server). Motion data 210 recorded by a sensor is associated with a particular user for whom the system verifies their identity. In implementations where motion data 210 is recorded directly or indirectly by a multitude of sensors, each recording is communicated independently to the identify block generator 220 for processing.

The identity block generator 220 receives motion data 210 recorded by a sensor (e.g., example a gyroscope or accelerometer embedded in a mobile device) as continuous signal, for example a signal sampled at a frequency of 100 Hz (resampled to 50 Hz). To improve processing capacity and accuracy, the identity block generator 220 divides the received signal into multiple segments of equal length. In one implementation, the identity block generator 220 generates segments 128 units in length. As described herein, the units that characterize the length of a segment refer to a unit that describes the continuous nature of the recorded signal, for example time (e.g., seconds or milliseconds). Accordingly, in some embodiments, each segment generated by the identity block generator 220 is 2.56 seconds long. The length of each segment and the units from which the segment is determined may be tuned by a human operator or supervisor based on a set of specifications received from an enterprise system, may be optimized over time by a machine-learned model, or a combination of both.

In some embodiments, a portion of the motion data 210 in a segment overlaps with a portion of motion data in the immediately preceding segment and a portion of motion data in the immediately succeeding segment. In an example implementation where the overlap between segments is tuned to 50%, motion data may be recorded from 0 to 256 samples. The identity block generator 220 generates a first segment including motion data recorded between 0 samples and 128 samples, a second segment including motion data recorded between 64 samples and 192 samples, and a third segment including motion data recorded between 128 samples and 256 samples. As will be further described below, the segmentation of motion data 210 allows the identity verification system 130 to identify transitions between movements or types of movements. For example, the system may segment motion data 210 into three portions: a user entering into a building with a quick stride, walking up the stairs, and then slowing to a standstill position in a room. Using the segmented motion data 210, the system is able to more accurately identify the user and to ensure a timely response to the user requesting access to an enterprise.

The identity block generator 220 converts each segment of motion data 210 into a feature vector that a machine-learned motion classification model is configured to receive. A feature vector comprises an array of feature values that represent characteristics of a user measured by the sensor data, for example a speed at which the user is moving or whether the user was moving their arms is encoded within the feature vector. In one implementation, the identity block generator 220 converts a segment of motion data into an n-dimensional point cloud representation of the segment using a combination of signal processing techniques, for example a combination of Fast Fourier transform (FFT) features, energy features, delayed coordinate embedding, and principle component analysis (PCA). The segmented motion may be stored as a vector, graph, and/or table with associated data corresponding to a value of the representation of the motion in that particular segment for the particular individual. The individual may additionally be assigned a unique identifier.

Based on the feature vector input to the machine-learned motion classification model, the motion classification model identifies a particular movement, for example speed walking, leisurely walking, or twirling a phone. Alternatively, the machine learned model identifies a broader category of movements, for example walking which includes speed walking and leisurely walking. The motion classification module may apply one or more clustering algorithms before processing each cluster of points to generate an output. In some implementations, the motion classification model additionally performs topological data analysis (TDA) to improve the accuracy or quality of identifications determined by the identity verification system 130.

In one embodiment, training of the machine-learned motion classification model is supervised, but in another embodiment training of the model is unsupervised. Supervised motion classification training requires a large amount of labelled data and relies on manual feedback from a human operator to improve the accuracy of the model's outputs. In comparison, unsupervised motion classification enables fine-grained motion classifications, with minimal feedback from a human operator.

Because the motion classification model outputs a movement classification for each segment of motion data, the identity block generator 220 interprets changes in a user's motion. In particular, between a segment labeled with a first movement and a segment labeled with a second movement, the identity block generator 220 identifies a motion discontinuity indicating the change in movements. As discussed above, a sequence of motion data may be divided into one or more segments with a certain level of overlap. Accordingly, in the example described above in which each segment shares a 50% overlap with both the immediately preceding segment and the immediately succeeding segment, the identity block generator 220 may only consider discontinuities between $25^{th}$ and $75^{th}$ percent of the segment. To enable the identity block generator 220 to identify discontinuities beyond the 25-75% range, the overlap between segments may be tuned manually based on a set of specifications received from an enterprise system, optimized over time by a machine-learned model, or a combination of both.

Between each of the identified discontinuities, the identity block generator 220 generates an identity block from the sequence of signals recorded between consecutive motion discontinuities. Because, in some implementations, consecutive segments are classified as the same movement, an identity block may be longer than the 128 units used to initially define a segment of motion data.

For each identity block, the identity computation module 230 generates one or more user identifications. Each identity block is broken into one or more signature sequences, which are converted into an identity confidence value. As described herein, the output of the identify computation module is referred to as an "identity confidence value" and corresponding to the identity value for a sequence of motion data within an identity block.

Determining identity confidence values on a per-sequence (at least one within an identity block) basis enables the identity verification system 130 to tailor its security assessment based on insights into a user's movements throughout a sequence of motion data. For example, during a first identity block, a first user's motion may be classified as walking and during a second identity block, the first user's motion may be classified as running. To confirm that the classification in the second identity block still refers to the first user, and not to a second user who ran away with the first user's phone, the identity computation module 230 independently determines several identity values for each identity block. To account for implementations in which a computing device may be carried or used by different users during different identity blocks, the identity computation module 230 may compute identity confidence values for an identity block independent of preceding or succeeding identity blocks.

To that end, the identity computation module 230 implements machine learning techniques to determine an identity for a user over each sequence of motion data. As will be further discussed below, the identity computation module 230 identifies a set of signature sequences within an identity block, which are representative of the entire sequence of motion data included in the identity block. As described herein, the identity computation module 230 inputs a set of signature sequences from each set of motion data to an identity confidence model to process each set of motion data. The identity confidence model may include a probability consideration. The identity computation module 230 converts the identified signature sequences into a feature vector and inputs the feature vector into an identity confidence model. Based on the input feature vector, the identity confidence model outputs an identity confidence value describing the likelihood that motion in the identity block was recorded by a particular, target user. A target user may be specified to an enterprise system or operational context based on a communication of private key or signifier known only to the target user from a computing device 110 to the enterprise system.

In some example embodiments, the identity computation module 230 outputs a numerical value, ranging between 0 and 1, where values closer to 0 represent a lesser likelihood that the motion data was recorded by the target user and values closer to 1 represent a greater likelihood that the motion data was recorded by the target user. Alternatively, the identity computation module 230 may determine confidence values using a logarithmic function in place of a raw numerical value (e.g., log(p) instead of (p)).

Because each identity block represents an independent event (e.g., a distinct action), the identity combination module 240 models a user's continuous activity by combining the identity confidence value or decay of identity confidence values from each block into a continuous function.

Additionally, data received from different sources, for example motion data, WiFi information, GPS data, battery information, or keyboard/mouse data) during the same time period may be processed by different models into distinct identity confidence values for each type of data. In such implementations, the identity combination module 240 may combine the distinct identity confidence values generated by each model into a single, more comprehensive identity confidence value for a particular point in time or period of time. As described herein, the output of the identity combination module 240 is referred to as an "aggregate identity confidence."

For data that is received from different sources but recorded during the same time period, the identity block generator 220 generates a new set of identity blocks and the identity computation module 230 determines an identity confidence value for each identity block of the new set. For example, if a set of motion data recorded over one hour is processed into three identity blocks, the identity computation module 230 determines an identity confidence value for each. If identity block generator 220 segments Wi-Fi data recorded during the same hour-long period into three additional identity blocks for which the identity computation module 230 determines three additional identity confidence values, the identity combination module 240 may combine the six distinct identity confidence values into an aggregate identity confidence for that period of time.

Figure 8:
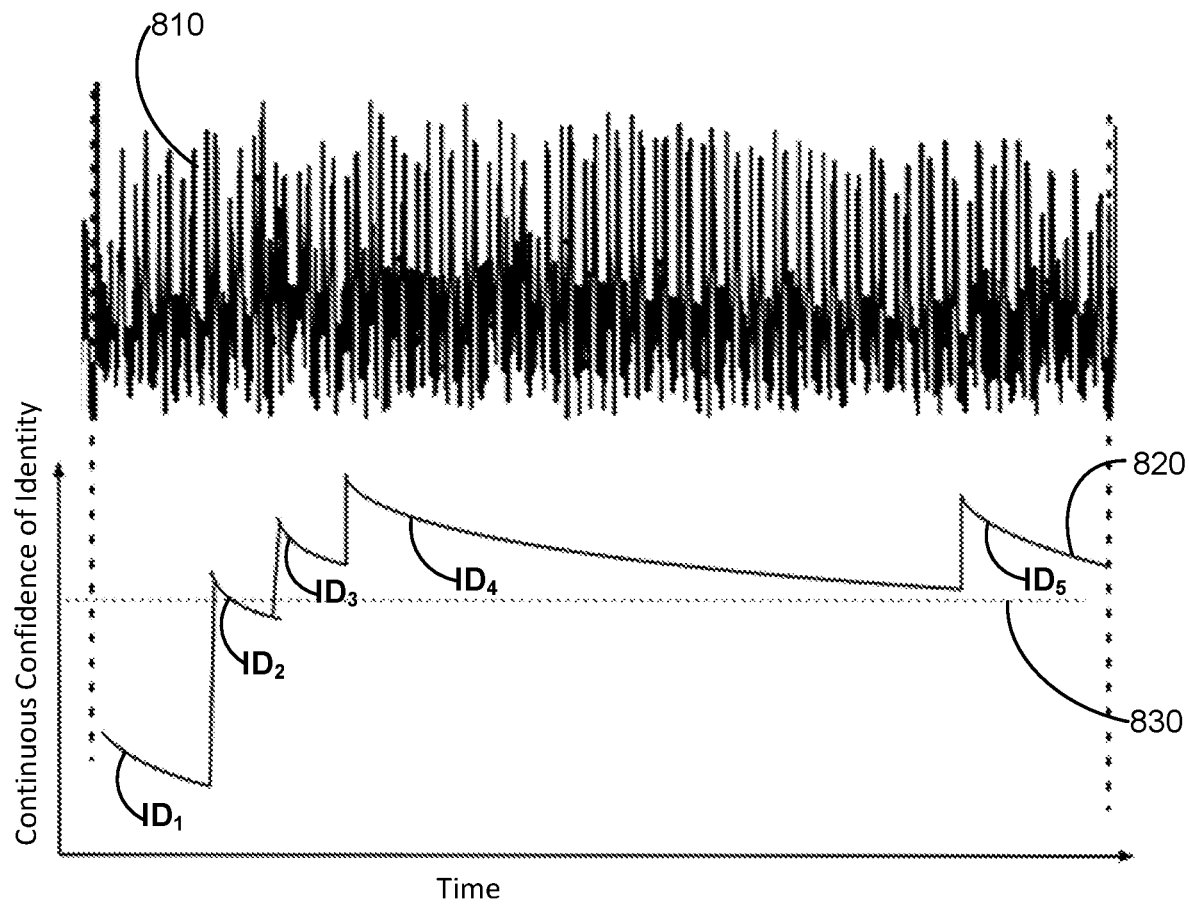
FIG. 8 illustrates an exemplary analysis for combining identity confidence values from multiple identity blocks, according to one embodiment.
Figure 9:
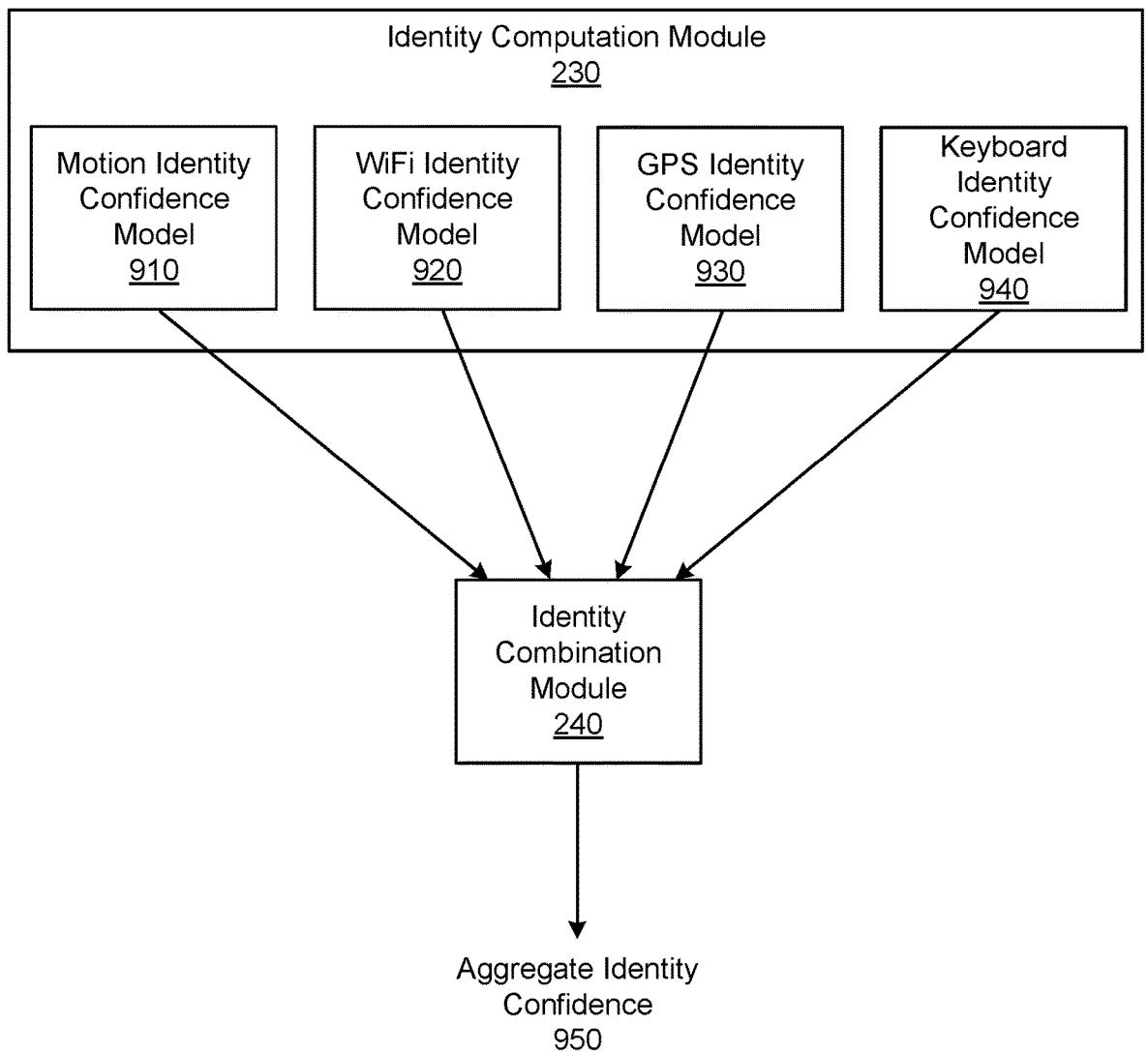
FIG. 9 illustrates a process for combining the outputs of various identity confidence models to authenticate the identity of a target user, according to one embodiment.

The combination of identity confidence values by the identity combination module 240 is further described with reference to FIGS. 8-10. By combining identity confidence values into an aggregate identity confidence that represents a continuously decaying confidence for a period of time, the identity verification system 130 enables seamless and continuous authentication of a target user compared to conventional systems which merely authenticate a user at particular point in time.

The confidence evaluation module 250 compares an identity confidence value or aggregate identity confidence, if applicable, to a threshold, for example an operational security threshold. Operational security thresholds may be generated by the identity computation module 230 and are further described with reference to FIG. 5. If an identity confidence value or an aggregate identity confidence is above the operational security threshold, the confidence evaluation module 250 confirms an identity of a target user and provides instructions for the target user to be granted access to the operational context. Alternatively, if the identity confidence value or aggregate identity confidence is below the operational security threshold, the confidence evaluation module 250 does not confirm the identity of the target user and, instead, communicates a request to the secondary authentication module 260 for a secondary authentication mechanism. Upon receipt of the request, the secondary authentication module 260 implements a secondary authentication mechanism, for example a biometric test or a different on-demand machine-learned model to confirm the identity of a target user.

In alternate embodiments, prior to communicating an identity confidence value to the identity combination module 240, the identity computation module 230 communications a single identity confidence value determined for a particular identity block directly to the confidence evaluation module 250. If the confidence evaluation module 250 determines the identity confidence is above an operational security threshold, the confidence evaluation module 250 confirms the identity of the target user and provides instructions for the target user to be granted access to the operational context. Alternatively, if the identity confidence value is below the operational security threshold, the confidence evaluation module 250 does not confirm the identity of the target user and, instead, communicates a request to the secondary authentication module 260 to implement a secondary authentication mechanism.

As will be described in greater detail below, the identity computation module 240 may implement an exponential decay function to model a dynamic confidence measurement over the time interval included in an identity block. In such implementations, at an initial time, a confidence measurement in a user's identity may decrease as time passes, resulting in a change in value that follows an exponentially decaying trend.

To preserve processing capacity and run-time, the identity computation module 230 may regulate the rate at which data is collected from various sources to minimize the number of identity instances to be computed. The identity computation module 230 may adaptively modify the receipt of motion data or the collection of motion data based on a location of a target user and/or current conditions relative to an operational context (e.g., a building, location, site, or area outfitted with an authentication security system). In some implementations, the identity computation module 230 may regulate data collection to a minimum rate required to maintain an identity confidence value above a threshold confidence. When the identity confidence value is significantly above the threshold, the rate of data collection may be reduced, but as the identity confidence decreases, due to a decay function in an identity block or between identity blocks, the rate of data collection may be increased at a proportional rate.

As another example, when a target user moves from one operational context to another (e.g., leaving a secure office), the identity computation module 230 may implement geo-fenced mechanisms that minimize data collection, for example since the system recognizes that the target user does not normally request authentication from outside the premises. However, if the target user were to request access to the operational context from outside the premises (e.g., a car or a distance beyond the geo-fence), identity verification system may implement a secondary authentication mechanism, for example a biometric authentication mechanism. Conversely, when a target user walks toward a locked door or logs into their computer in the morning, the identity computation module 230 increases data collection, and may even collect this data over a cellular connection, to allow or deny access to the door with minimal user intervention and without secondary authentication.

In alternate embodiments (not shown) motion data 210 may be input directly to the identity computation module 230 rather than the identity block generator 220. In such embodiments, the identity computation module 230 encodes the motion data into a feature vector and uses a motion classification model to determine a motion classification for the feature vector. In such embodiments, the motion classification is input to an appropriate identity confidence model to predict the identity of a target user. The appropriate identity confidence model may be selected based on the source of the data or the type of behavioral data.

To evaluate the performance of each identity confidence model active during the processing of motion data and/or the authentication of target user requesting access to an operational context, the system quality assessment module 270 may analyze identity confidence values generated by the identity computation module 220 and authentication decisions made by the confidence evaluation module 250. In some embodiments. The system quality assessment module 270 evaluates the quality of an identity confidence model in real-time based on performance metrics including, but not limited to, a false acceptance rate, false rejection rate, false match rate, or false non-match rate. The system quality assessment module 270 is further described with reference to FIG. 13.

Generating Identity Blocks

Figure 3:
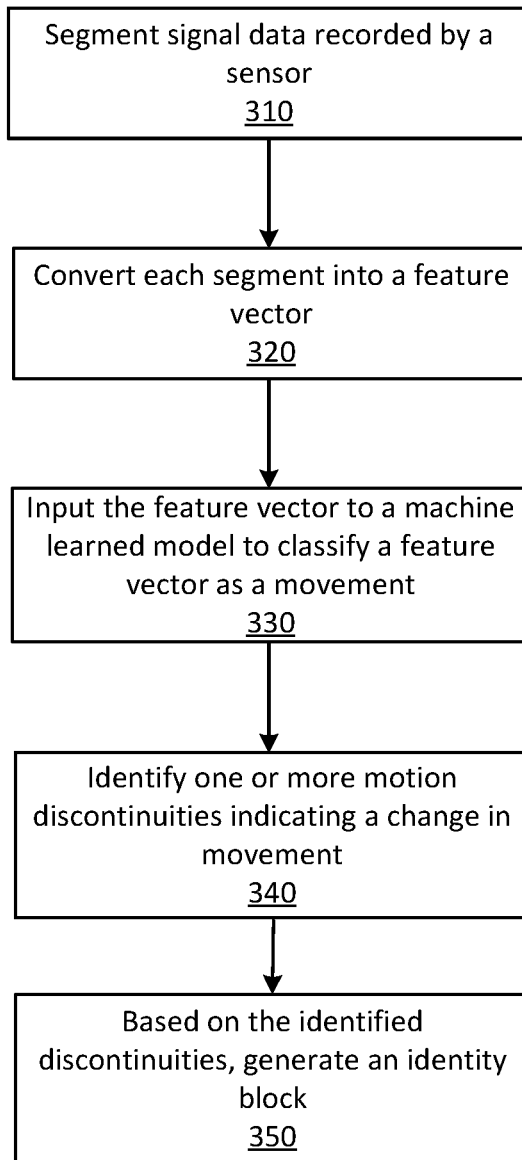
FIG. 3 illustrates a process for generating an identity block based on segments of motion data, according to one embodiment.

As described above, the identity verification system 130 processes sequences of motion data, for example motion data 210, into identity blocks that represent particular movements that a user has performed. FIG. 3 illustrates an example process for generating an identity block based on segments of motion data, according to one embodiment. Note that the reference to process includes the actions described in the process or method. Further, the steps of the process also may be embodied as program code (e.g., software instructions) and may be executable by a processor (or controller) to carry out the process when executed. The program code may be stored and executed using some or all of the components described in, for example, FIG. 15. Moreover, the program code also may be instantiated through other processing systems, for example, application specific integrated circuits (ASICs) and/or field programmable gate arrays (FPGAs), in addition to or in lieu of some or all of the components described with FIG. 15.

The identity verification system 130 segments 310 motion data recorded by one or more sensors. The length and delineation between segments may be tuned to enable to the system 130 to identify a target user with improved accuracy. In most common embodiments, each segment is 128 units long with a 50% overlap with an immediately preceding and immediately succeeding segment.

The identity verification system 130 converts 320 each segment into a feature vector representing characteristics of motion data within the segment. In some implementations, each feature vector is a point cloud representation of the sequence of motion data 210. The feature vector is input 330 to a machine learned model, for example a motion classification model, to classify the converted sequence of motion data as a particular movement or type of movement. Training of the motion classification model may be supervised, or alternatively unsupervised, based on the volume of available training data and the required complexity of the motion classification model. In implementations requiring a larger volume of training data, a more complex model, or both, the identity verification system 130 trains the motion classification model using unsupervised training techniques.

Using the motion classification model, the identity verification system 130 outputs a motion classification for each segment of motion data. Accordingly, the identity verification system 130 compares the motion classification of a particular segment against the classifications of an adjacent or overlapping segment to identify 340 one or more motion discontinuities. As described above, a motion discontinuity indicates a change in motion classification between two segments and may be interpreted as a change in movement by the target user in question. In such an embodiment, the identity verification system 130 generates 350 one or more identity blocks between the identified discontinuities. In addition to those described above, the identity verification system may generate identity blocks using alternate methods.

Figure 4:
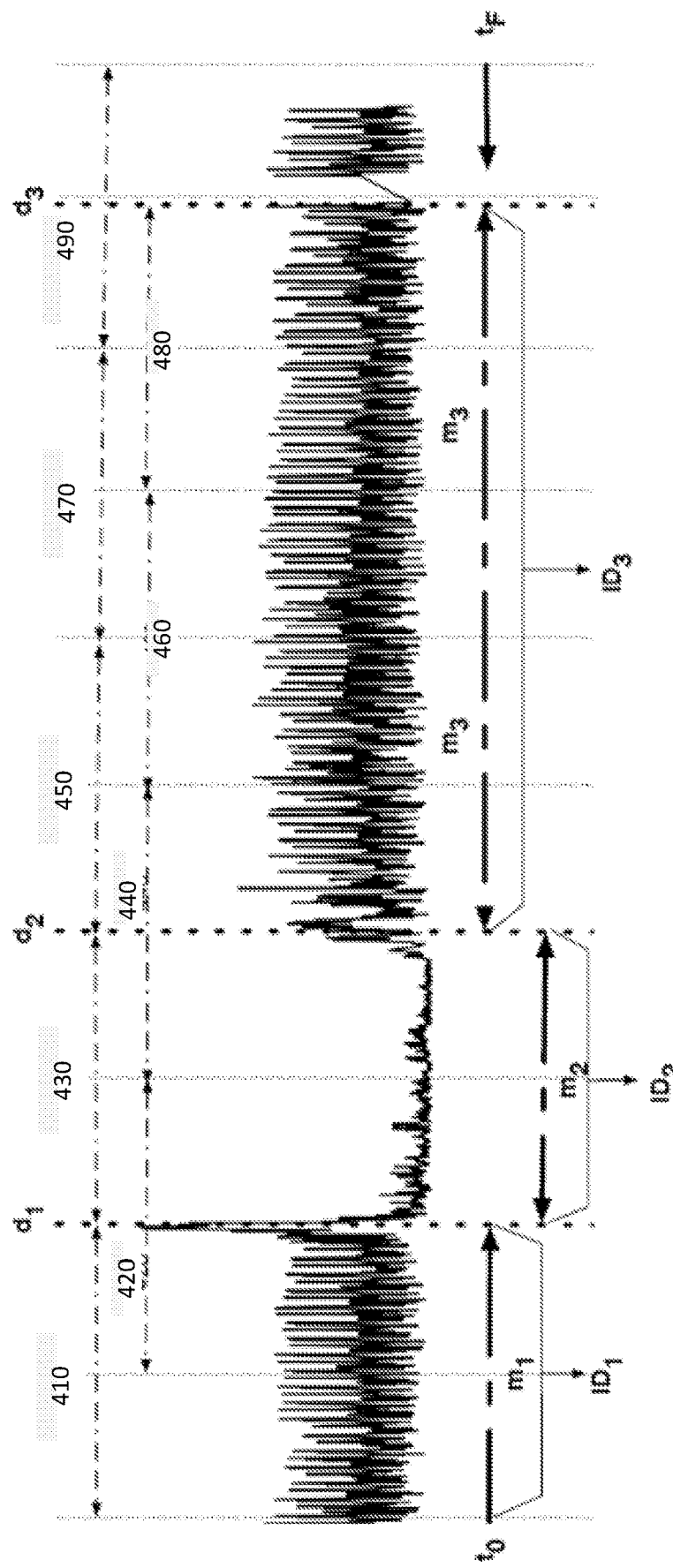
FIG. 4 illustrates an analysis for generating identity blocks from an example segment of motion data, according to one embodiment.

FIG. 4 illustrates an analysis for generating identity blocks from an example segment of motion data, according to one embodiment. The example illustrated in FIG. 4 includes a sequence of motion data recorded for a user between the times $t_0$ and $t_F$. The sequence is divided into nine overlapping segments of motion data: segment 410, segment 420, segment 430, segment 440, segment 450, segment 460, segment 470, segment 480, and segment 490. If each segment is generated to be 128 samples long with a 50% overlap, segment 410 would range between 0 and 128 samples, segment 420 between 64 and 192 samples, segment 430 between 128 and 256 samples, segment 430 between 192 and 320 samples, and so on. The identity block generator 220 inputs each segment of motion data into a motion classification model to output a motion classification for each segment. As illustrated in FIG. 4, segment 410 is classified as movement $m_1$, segment 430 is classified as movement $m_2$, segment 450, segment 460, segment 470, and segment 480 are classified as movement $m_3$, segments 420, 440, and 490 get classified as multiple movement types and are discarded. Because each classification of $m_1$ to $m_3$ represents a different movement or type of movement, therefore the identity block generator 220 identifies motion discontinuities $d_1$, $d_2$, and $d_3$ at the transition between $m_1$ and $m_2$, $m_2$ and $m_3$, and at the end of $m_3$ respectively. Because segments 450, 460, 470, and 480 were classified as the same movement ($m_3$), the identity block generator 220 determines that there are no motion discontinuities between these four segments.

Based on the initially defined segments and the identified motion discontinuities, the identity block generator 220 generates a first identity block $ID_1$ between to and $d_1$, a second identity block $ID_2$ between $d_1$ and $d_2$, and a third identity block $ID_3$ between $d_2$ and $d_3$. Because the segments 450, 460, 470, and 480 were given the same motion classification, all four segments are combined into identity block $ID_3$. Accordingly, identity block $ID_3$ represents a longer period of time than the other illustrated identity blocks. Returning to the example in which each initial segment is 128 samples long, identity block $ID_3$ represents a period of time two and half times as long period as a single segment, or 320 samples.

The identity block generator 220 correlates each identity block with the sequence of motion data that it contains and may convert each identity block back into the segment of motion data. The converted segment of motion, represented as sequences of motion data signals, are communicated to the identity computation module 230. Returning to FIG. 4, identity block $ID_1$ is converted to segment 410, ID2 is converted to segment 430, and ID3 is converted to segments 450, 470, and 480. Accordingly, the converted segments are non-overlapping. However, in some embodiments, the end of an identity block includes an overlapping sequence to confirm that each sample of motion data in an identity block is considered in the computation of an identity confidence value.

In alternate embodiments, boundaries used to identify individual identity blocks may be triggered by external signals. For example, if a target user wears wearable sensor configured to continuously monitor the target user, removal of the wearable sensor may conclude an identity block and trigger identification of a boundary of the identity block. As other examples, a computing device previously in motion that becomes still, an operating software on a computing device that detects that a user has entered a vehicle, or a user crossing a geofenced boundary may similarly trigger identification of a boundary for an identity block.

Computing User Identity

Using signature sequences from an identity block, the identity computation module 230 outputs a value—an identity confidence value—characterizing a confidence level that the motion recorded in the identity block refers to a particular target user. Returning to the above example where a second user picks up a first user's phone from a table and runs away with it, the identity block generator 220 generates a first identity block during which the first user is walking with the phone, a second identity block during which the phone is resting on the table next to the first user, and a third identity lock during which the second user is running away with the phone. Assuming the first user is the target user the identity computation module 230 outputs values for the first and second identity block that indicate a high confidence that the motion refers to the first user. In comparison, the identity computation module 230 outputs a low confidence value for the third identity block indicating that the running motion data does not refer to the first user.

Figure 5:
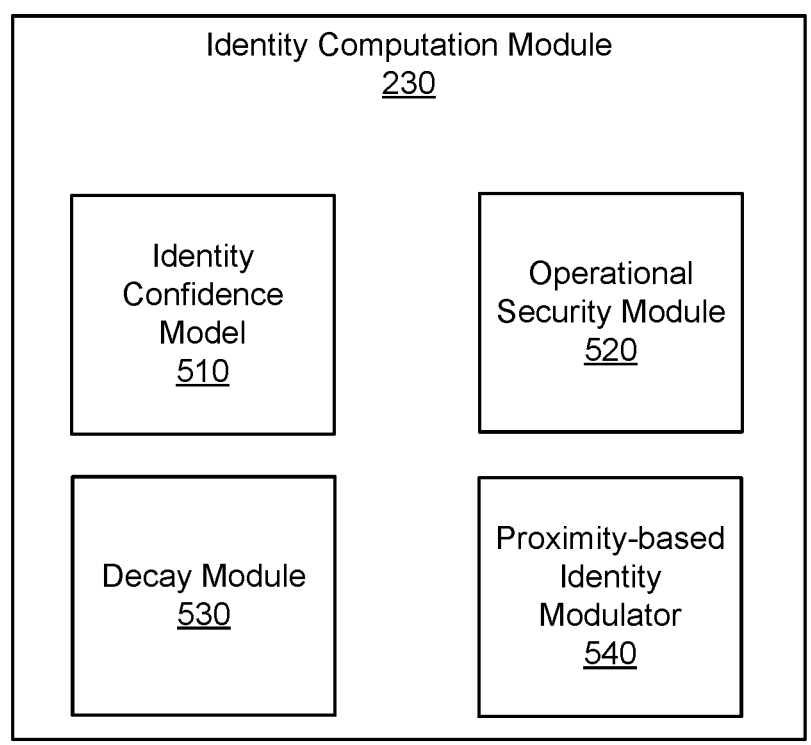
FIG. 5 is a block diagram of the system architecture of the identity computation module, according to one embodiment.

FIG. 5 is a block diagram of an example system architecture of the identity computation module 230, according to one embodiment. The identity computation module 230 includes an identity confidence model 510, an operational security model 520, a decay module 530, and a proximity-based identity modulator 540. In some embodiments, the identity computation module 230 includes additional modules or components. In some embodiments, the functionality of components in the identity computation module 230 may be performed by the identity combination module 240. Similarly, in some embodiments, functionality of the identity combination module 240 may be performed by the identity computation module 230.

The identity confidence model 510 generates an identity confidence value within a range of values, for example between 0 and 1. An identity confidence value indicates a confidence that a set of motion data identifies a target user. As an identity confidence value increases towards one end of the range, for example towards 1, the confidence in the identity of the target user increases. Conversely, as an identity confidence value decreases towards an opposite end of the range, for example towards 0, the confidence in the identity of the target user decreases.

Given an operational context the operational security module 520 determines a security threshold against which the identity confidence value determined by the identity confidence model 510 is compared. The operational context under which a target user is granted access may be associated with varying levels of risk depending on the conditions under which the target attempts to gain access, the content to which the target user attempts to gain access, or a combination thereof. As described herein, an operational context describes asset-specific circumstances, user-specific circumstances, or a combination thereof. Asset-specific circumstances describe the actual asset that a target user is requesting access to and the environment in which the asset is secured. In an implementation where an operational context is characterized based on an asset itself, the operational security module 520 may assign a greater risk operational context to a bank vault containing priceless pieces of art compared to an empty bank vault. Examples of an environment or asset that a target user is requesting access include, but are not limited to, a secured physical environment, a secured digital server, or a secured object or person. For example, the operational security module 520 may assign a bank vault a greater risk operational context than a safe in a hotel room. As an additional example, the operational context for an asset at a site located in Russia may be characterized differently than the access to the same asset at a site located in the United States.

Additionally, an operational context may vary based on the types of actions required for a user to enter a site. For example, the operational context for a site which can be entered by opening a single door may be assigned a higher level of risk than a site which can be entered by navigating through several hallways and by opening several doors. User-specific circumstances describe the conditions under which a target user requests access to a secured asset. Examples of user-specific circumstance include, but are not limited to, a location or site of a target user when they request access or a period of time at which a target user requests access. For example, an operational context where a target user requests access to a secured asset from inside of the building may be assigned a different level of risk than an operational context where a target user requests access to a secured asset from outside of a perimeter of the building. The granularity of location data used to characterize an operational context may vary from specific latitude and longitude coordinates to more general neighborhoods, cities, regions, or countries. Alternatively, if a target user attempts to access a bank vault after running to the vault (the running motion identified using the identity classification model), the bank vault may be dynamically associated with a greater risk operational context than if the target user had walked up to the vault.

The operational security module 520 may determine an operational context based on conditions of an enterprise providing the operation. For example, if an enterprise is tasked with regulating access to a vault, the operational security module 520 may determine the operational context to be a vault. The module 520 may additionally consider the type of content or asset for which access is being given. For example, if a user is granted access to digital medical files, the operational security module 520 may determine the operational context to be a hospital server. The operational security module 520 may additionally determine the operational context based on enterprise-specific location data.

In addition to the factors described above, the operational context may be determined based on any other combination of relevant factors. In some embodiments, the operational security module 520 may access vacation data, for example paid time off (PTO) records and requests, data stored on travel management sites, and enterprise employee data to evaluate whether a target user should be allowed access. For example, if vacation data and travel management data indicate that a target user is scheduled to be out of town, the operational security model 520 increases the operational security threshold for the target user since they are unlikely to be requesting access during that time. Similarly, based on employee data, if a target user was recently promoted and granted a higher security clearance, the operational security model 520 may decrease the security threshold for that target user. In some embodiment, an operator affiliated with an enterprise system may manually specify an operational context or confirm the determination made by the operational security module 530.

Given an operational context, the operational security module 530 determines an operational security threshold. The operational security threshold is directly correlated with the level of confidence required for a particular action assigned to an operational context. In some embodiments, access to an operational context with a high operational security threshold is granted in situations where the identity computation module 230 generates an elevated identity confidence value. Accordingly, in such embodiments, access is granted to users for whom the identity computation is highly confident in their identity.

In some embodiments, the operational security module 530 may implement a machine-learned security threshold model to determine an operational security threshold. In such implementations, the operational security module 530 encodes a set of conditions representative of a level of risk associated with the operational context, a level of security typically associated with the operational context, or a combination thereof as a feature vector. The feature vector is input the security threshold model to output an operational security threshold. Considerations encoded into such a feature vector may include, but are not limited to, a value of content to which access is being granted, a level of security clearance required for access to granted, a number of people with appropriate security clearance. The security threshold model may be trained using a training dataset comprised of operational security contexts characterized by a feature vector of such considerations and labeled with known security thresholds. Accordingly, based on the training dataset, the model is trained to optimally predict security thresholds when presented with novel operational contexts.

In some embodiments, the operational security threshold is directly related to conditions described above. For example, as the value of the content to which access is being granted increases and the level of security clearance increase, the operational security threshold increases and, resultingly, the minimum identity confidence value for access to be granted (e.g., the identity confidence value generated by the identity confidence model 510) increases. Alternatively, the operational security threshold is indirectly related to conditions described above. For example, as the number of people with appropriate security clearance decreases, the operational security threshold increases and, resultingly, the minimum confidence in a user's identity to be granted access also increases. Alternatively, an operator affiliated with an enterprise system may specify an operational security threshold or confirm the determination made by the security threshold model.

Given an operational context, the decay module 530 determines decay and risk parameters to model decay of an identity confidence value. In some embodiments, the decay module 550 estimates parameters using Bayesian estimation techniques where an enterprise administrator is trained to calibrate their probability estimation. In some embodiments, the risk associated with each operational context is estimated by the administrator and, in other embodiments, the risk is empirically measured based on data accessed from the enterprise or received from other companies in a similar field. The determined parameters processed by the confidence evaluation module 250 through a Dynamic Bayesian Network (DBN). In alternate embodiments, these parameters are estimated in a non-Bayesian framework in consultation with a stakeholder in the target enterprise.

Additionally, the decay module 530 may compute the decay and risk parameters based on a combination of location data for a corresponding operational context and location data for a target user attempting to gain access to the operational context. These parameters are processed by the confidence evaluation module 530 in a manner consistent with the Equations described below.

Based on the determined decay parameters, the decay module 530 dynamically adjusts the identity confidence value output by the identity confidence model 510 based on the location data recorded for a target user. The operational security module 520 may receive a record of anticipated locations at which an enterprise system expects a target user to request access and compare that to location data characterizing the target user's current location. In such implementations, location data may be recorded as GPS data on a computing device, for example, computing device 110. Such a computing device may be the same computing device recording a user's motion data or, alternatively, a different computing device. Alternatively, the operational security module 520 may compare the record of anticipated locations with location data assigned to the operational context. If neither the user's current location data nor the location data assigned to the operational context match any anticipated locations, the decay module 530 may accelerate the decay of the identity confidence value output by the identity confidence model 510.

Similar to the decay parameters, the decay module 530 may determine risk parameters based on current location data for a target user and a record of anticipated locations for the target user. For example, if location data for a target user indicates that they are in an unsecure, public location (e.g., a coffee shop or a restaurant), the decay module 530 may detect an increased level of risk and determine risk parameters that decrease the identity confidence value. Additionally, if a target user's current location data does not match with a record of their anticipated locations, the decay module 530 may detect an increased level of risk and determine risk parameters that decrease the identity confidence value. Alternatively, if a target user's location data or the conditions in an operational context indicate a reduced level of risk, the decay module 530 may determine risk parameters that reflect the lower level of risk and increase the identity confidence value output by the identity confidence model 510.

Alternatively, as described below, the identity combination module 240 may adjust an identity confidence value based on risk parameters. Such an adjustment may be interpreted as an indication that a user could be requesting access to information or content that they should not have access to. Accordingly, the confidence in that user's identity should be decreased. In alternate implementations, rather than dynamically adjusting an identity confidence value, the operational security module 520 adjusts the operational security threshold, for example by increasing the threshold if neither a user's current location data nor the location data assigned to the operational context match an anticipated location. The decayed identity confidence values may be communicated to the confidence evaluation module 250, which determines whether or not to grant a target user access to the operational security context.

Figure 6:
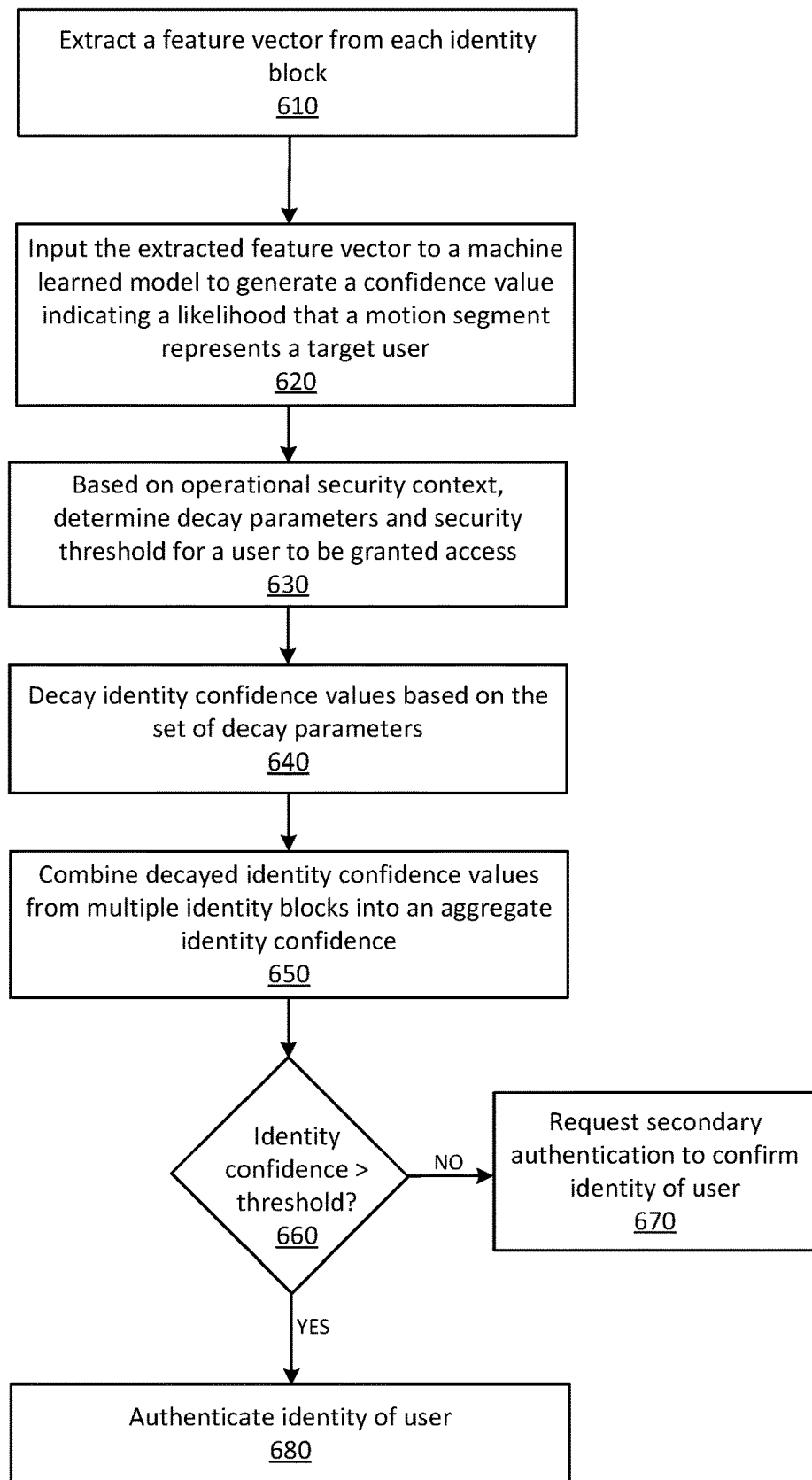
FIG. 6 illustrates a process for authenticating the identity of a user for an identity block, according to one embodiment.

FIG. 6 illustrates an example process for authenticating the identity of a user for an identity block, according to one embodiment. From each identity block, the identity verification system 130 identifies a set of signature sequences in each identity blocks and extracts 610 a feature vector from the signature sequences. The extracted feature vector is representative of characteristics of the motion data included in the identity block. The identity computation module 220 inputs 620 the extracted feature vector to a machine learned model to generate an identity confidence value indicating a likelihood that a segment of motion data represents a target user.

Based on an operational security context for which a target user requests access, the identity verification system 130 determines 630 determines decay parameters and an operational security threshold for a user to be granted access. The identity verification system decays 640 the identity confidence value to the current time, or alternatively the time for which a target user's identity should be verified, based on the determined decay parameters. As described above, the identity confidence value is determined for an individual identity block, but, the identity verification system 130 receives data from multiple data sources over a range of times which results in the generation of several identity blocks. Accordingly, the identity verification system 130 combines 650 decayed identity confidence values from the several identity blocks into an aggregate identity confidence. The aggregate identity confidence is compared 660 to the security threshold. If the aggregate identity confidence is below the operational security threshold, the identity verification system 130 requests 670 a secondary authentication to confirm the identity of the target user. If the identity confidence value is above the threshold, the identity verification system 130 authenticates 680 the identity of the target user.

In some embodiments described with reference to FIGS. 8-10, the identity verification system 130 combines identity confidence values determined from motion data received from various data sources into an aggregate identity confidence. The operational security module 520 determines a set of risk parameters for the operational context and adjusts the aggregate identity confidence based on the risk parameters. The aggregate identity confidence is then compared to the operational security threshold to evaluate whether to grant access to a target user.

Modeling Identity Confidence Value Decay

Effective security management systems recognize that while access may be granted to a user at a particular point in time, the user may maintain that security access for an extended period of time. For example, in response to entering a correct password, a user may retain access to an account for longer than necessary. As another example, in response to approving a security card, a user may remain in a locked room for longer than necessary. Accordingly, the identity verification system 130 continuously receives sensor captured data and updates security access granted to a user based on that captured data. Additionally, when computing identity probabilities for a target user, the decay module 510 may simulate a decaying confidence value as an exponential decay curve that may be a function of time and/or action expectation given an operational security context. In particular, the decay module 550 may implement a decay function to model an identity of a user over a period of time rather than for a particular point in time. Returning to the example in which a user remains in a locked room for longer than necessary, the identity confidence model 510 may compute an identity confidence value which decays exponentially the longer the user remains in the room. If the user remains in the room for over a period of time, the confidence value computed by the identity confidence model may decay below a threshold value. If the identity confidence value decays below the threshold value, the identity verification system 130 may revoke the user's access, send, a notification to security to remove the user from the room, or a combination of both.

Figure 7:
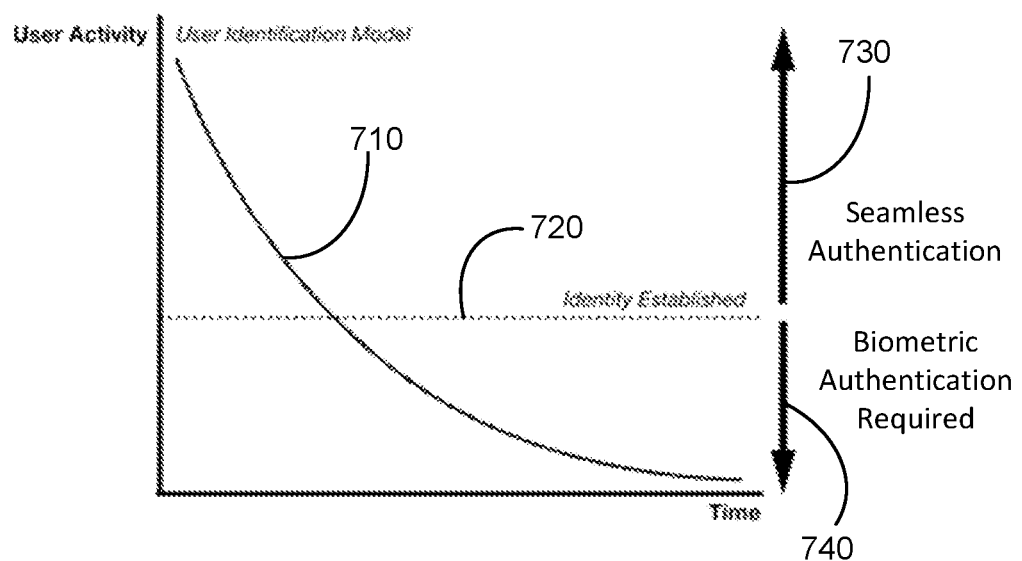
FIG. 7 illustrates an exemplary analysis for evaluating a target user's identity using a decay function and given a threshold confidence, according to one embodiment

FIG. 7 illustrates an exemplary analysis for evaluating a target user's identity using a decay function and given a threshold confidence, according to one embodiment. In the illustrated embodiment, an identity confidence value 710 for a target user decays over time according to an exponential decay function. At an initial time (e.g., the start of an identity block), the identity confidence value 710 is a numerical value well above an operational security threshold 720. At the initial time and at all subsequent where the identity confidence value 710 is above the threshold 720, the target user is granted access with seamless authentication 730. As described herein seamless authentication refers to authentication which verifies a user's identity without implementing a secondary authentication mechanism (e.g., a biometric scan). As time passes, the identity confidence value decreases at an exponential rate, eventually decreasing below the threshold 720. When the confidence value drops below the threshold 720 and for all subsequent times when the confidence value remains below the threshold 720, the identity verification system 130 relies on a secondary authentication mechanism, for example biometric authentication 840, to confirm the identity of the target user.

In one example embodiment, to model an identity confidence value as a function of time, the decay module 550 applies decay parameters to identity confidence values within individual identity blocks. To do so, the decay module 550 lowers an identity confidence value (p) using a combination of monotonic functions parameterized by a time constant ($\lambda$). Depending on the operational context, an identity confidence value with a more rapid decay may provide for more secure conditions. For example, if a target user is in a vulnerable or unsafe location, the operational context may be assigned a large $\lambda$-value resulting in a faster decay in identity confidence value compared to a safe or secure location that is assigned a smaller $\lambda$-value.

In the first example embodiment, Equation (1) produced below models the decay of an identity confidence value ($p_2$) of a target user between a time $t_2$ and an earlier time $t_1$, wherein motion data between $t_1$ and $t_2$ are included in the same identity block.

$$p_{2t_2} = p_{2t_1} e^{-\lambda(t_2 - t_1)} \quad (1)$$

In Equation (1), $\lambda$ is a time constant defined depending on an operational context. In an alternate embodiment, the decay may be modeled as a fixed ratio for each time step of a period of time resulting in an exponential decay. In yet another embodiment, the decay may be modeled as a fixed value at each time step resulting in a linear decay. In the example described above, the identity confidence value at a final time $t_f$ decays to 0, however in other embodiments, the identity confidence value may decay to another constant value (e.g., 0.5).

In a second example embodiment, the decay module 550 determines the decay of an identity confidence value between identity blocks. In this example, depending on the actions to be performed by a target user and the conditions under which such actions are to be performed (e.g., time of day and the location) the decay is modeled using a time constant ($\lambda_1$) and a strength constant ($\xi$). Consistent with the description of the first implementation, operational contexts associated with high levels of risk may be assigned higher time constants and lower strength constants than operational contexts with low levels of risk, which results in a more rapid decay of the identity confidence value. As described above, depending on the operational context, an identity confidence value may preferably decay at a rapid rate. In operational contexts associated with a higher level of risk, the strength constant may be decreased, or set equal to 0, resulting in an instantaneous decay of the identity confidence value.

In the second example embodiment, Equation (2) produced below models the decay of an identity confidence value ($p_3$) for an identity block based on an identity confidence value ($p_2$) determined for an immediately preceding identity block.

$$p_{3t_2} = p_{2t_1} \xi e^{-\lambda_1(t_2-t_1)} \quad (2)$$

In Equation (2), $\lambda_1$ is a time constant and $\xi$ is a strength constant, both of which are defined depending on an operational context. $t_1$ is a time at the conclusion of the preceding identity block, $t_2$ is a current time or a time at which a target user's identity is verified in a current identity block for which authentication is being computed, and $p_{2t_1}$ is a decayed confidence identity value computed at the conclusion of the preceding identity block.

Combining Identity Confidence Values

As described above with reference to FIG. 2, the identity combination module 240 combines identity confidence values from various signature sequences in various identity blocks into a continuous time sequence to provide a holistic representation of a target user's activity and the confidence associated with each set of motion data included in those activities. FIG. 8 illustrates an exemplary analysis for combining identity confidence values from multiple signature sequences within a single identity block, according to one embodiment. For a sequence of motion data 810, the identity block generator 220 divides a single identity blocks into signature sequences—$ID_1$, $ID_2$, $ID_3$, $ID_4$, and $ID_5$. For each signature sequence, the identity computation module 230 generates a unique identity confidence value and the decay module 570 converts each identity confidence value into a curve representing the decay of the identity confidence value. The identity combination module 240 combines each decay curve to a continuous identity confidence curve 820 that represents an aggregate identity confidence. Additionally, for the identity block, the identity computation module 230 computes an operational security threshold based 830 on an operational context relevant to the identity block. Taken individually, each identity block represents a dynamically changing confidence that a target user is themselves.

However, taken in combination, they represent a dynamically changing confidence that a target user engaged in a continuous sequence of activities over an extended period of time. Accordingly, the identity combination module 240 aggregates the decaying identity values into a continuous identity confidence curve 820. As is illustrated, the identity confidence curve 820 for each signature sequence is connected to an identity confidence curve for an immediately consecutive signature sequence by a vertical line. Additionally, if the operational context for which a target user's identity is being evaluated does not change over the sequence of motion data, the operational security threshold 830 computed by the operational security module 530 remains constant. In alternate embodiments, the operational security threshold may change as the target user becomes involved in a different operational security context. In such embodiments, the identity combination module 240 may separate the motion sequence into a first set of data pertaining to a first operational context and a second set pertaining to a second operational context and compare each set against the operational security threshold for the respective operational context.

In the illustrated embodiment of FIG. 8, the identity confidence curve for sequence $ID_1$ is below the threshold 830, however the identity confidence curve for sequence $ID_2$ begins above the threshold before decaying below the threshold. Accordingly, between sequence $ID_1$ and sequence $ID_2$, the computed confidence in a target user's identity increased. Similarly, the computed confidence in the target user's identity continued to increase between $ID_2$ and $ID_3$ and between $ID_3$ and $ID_4$. Although the continuous curve 820 indicates a slight decrease in confidence between $ID_4$ and $ID_5$, the confidence in the target user's identity in sequence $ID_5$ did not fall below the threshold 830. Accordingly, based on the illustrated curve 820, the identity combination module 240 determines not to grant the target user access to the operational context without secondary authentication during any time between the start time and end time of Additionally, the identity combination module 240 may determine to grant access to the operational context at the start time of $ID_2$, but will require secondary authentication during $ID_2$ to maintain access. The identity combination module 240 further determines to continuously grant the target user access to the operational context from the start time of $ID_3$ to the end time of $ID_5$, without additional confirmation from a secondary authentication mechanism.

In some example embodiments, the identity computation module 230 may implement a different source-specific identity confidence model to process motion data (or another type of data, e.g. keyboard data) depending on which source recorded the motion data. For a given identity block (and signature sequence), each identity confidence model outputs an identity confidence value and the identity combination module 240 aggregates each identity confidence value into an aggregate identity confidence. FIG. 9 illustrates a process for combining the outputs of various identity confidence models to authenticate the identity of a target user, according to one embodiment. In the illustrated embodiment, the identity computation module 230 includes multiple source-specific confidence models compared to the embodiment discussed with reference to FIG. 5, which involved a single confidence model. In particular, the identity computation module 230 illustrated in FIG. 9 includes a motion identity confidence model 910 for processing motion data (e.g., recorded by accelerometers or gyroscopes), a WiFi identity confidence model 920 for processing data recorded via WiFi signals, a GPS identity confidence model 930 for processing data recorded via GPS signals, AND a keyboard confidence model 940 for processing data related to a how a user types on a computing device. In addition to those described above, the identity computation module may include additional identity confidence models to process any additional types of information not disclosed herein.

The identity combination module 240 combines the identity confidence generated by each model (e.g., each of the model 910, 920, 930, and 940) into an aggregate identity confidence 950. In some example embodiments, an aggregate identity confidence may be computed based on identity confidence values generated by a first model (e.g., a motion identity probability model 910) and a second model (e.g., a GPS identity confidence model 930) according to Equation (3):

$$p_{3t_2} = 1 - (1-\alpha p_{1t_2})(1-\beta p_{2t_2}) \quad (3)$$

where $p_1$ and $p_2$ are existing identity confidence values output by a first model ($m_1$) and a second model ($m_2$), respectively, where both $p_1$ and $p_2$ are decayed to time $t_2$. $p_{32}$ represents the aggregate identity confidence and both a and are risk parameters used to weight $p_1$ and $p_2$, respectively.

In alternate embodiments, the identity combination module 240 may leverage a Bayesian framework in which a target user is defined as a source node and the outputs of each identity confidence model are defined as target nodes with values $p_1$ and $p_2$. The aggregate identity confidence may be calculated using various Bayesian inference techniques including, but not limited to, Markov chain Monte Carlo (MCMC), Bayesian inference using Gibbs Sampling (BUGS), Clique Tree, and loopy belief propagation.

As described above, if an identity confidence value is below a threshold, the identity computation module 230 may implement a secondary authentication mechanism, for example a biometric test to verify the user's identity. In such embodiments, the secondary authentication mechanism generates a secondary identity confidence value that is combined by the identity combination module 240 with the identity confidence value generated by an identity confidence model. Accordingly, the identity combination module 240 implements Equation (3) to combine the secondary identity confidence value and the identity confidence value into an aggregate identity confidence value. In such implementations, $p_2$ is replaced with $p_\gamma$, which represents the decayed secondary identity confidence value generated by the secondary authentication mechanism and $t_2$ represents the time at which the target user requested access to the asset. Decay in secondary confidence values generated by secondary authentication mechanisms may be modeled using the techniques described above with reference to FIG. 7.

In some embodiments, despite the combination of identity confidence values from multiple sources, the aggregate identity confidence may still be below an operational security threshold. Accordingly, the identity computation module 230 requests secondary authentication and, in response to receiving a secondary identity confidence value, the identity combination module 240 executes a second round of processing to combine the secondary identity confidence value with the aggregate identity confidence to generate an updated aggregate identity confidence. If the updated aggregate identity confidence value is greater than an operational security threshold, access is granted. If the updated aggregate identity confidence value is less than the operational security threshold, access is denied.

In an exemplary implementation involving a combination of probability models, the identity verification system 130 identifies a target user requesting access to an operational context. The target user engages in a plurality of activities or action types which are recorded by a plurality of data sources, for the example the data sources described with reference to FIG. 9. Data recorded by each of the data sources, for example keyboard data, motion data, Wi-Fi data, are received by the identity computation module 230. The identity computation module 230 employs several probability models, each of which is configured to receive a particular type of data or data describing a particular type of activity. The identity computation module 230 inputs each type of data into a respective probability model, which generates an identity confidence value based on the type of data. A set of decay parameters, for example those determined by the decay module 550, are applied to each identity confidence value resulting in an exponentially decaying identity confidence value. As described with reference to FIG. 5, the same set of decay parameters may be applied to each identity confidence value because the set of decay parameters are determined based on the operational context.

To capture a complete evaluation of the target user's identity, the identity combination module 240 aggregates each decayed identity confidence value into an aggregate identity confidence. In some embodiments, the level of risk associated with granting access to an operational context is modeled using a set of risk parameters. The risk parameters may be used to scale an aggregate identity confidence to reflect the level of risk. Accordingly, the aggregate identity confidence may be adjusted based on the risk parameters. Once adjusted, the aggregate identity confidence is compared to the operational security threshold. If the aggregate identity confidence is greater than the threshold, the target user is granted access. If the aggregate identity confidence is below the threshold, the identity computation module 230 may request a secondary authentication mechanism to further evaluate the identity of the target user.

Figure 10:
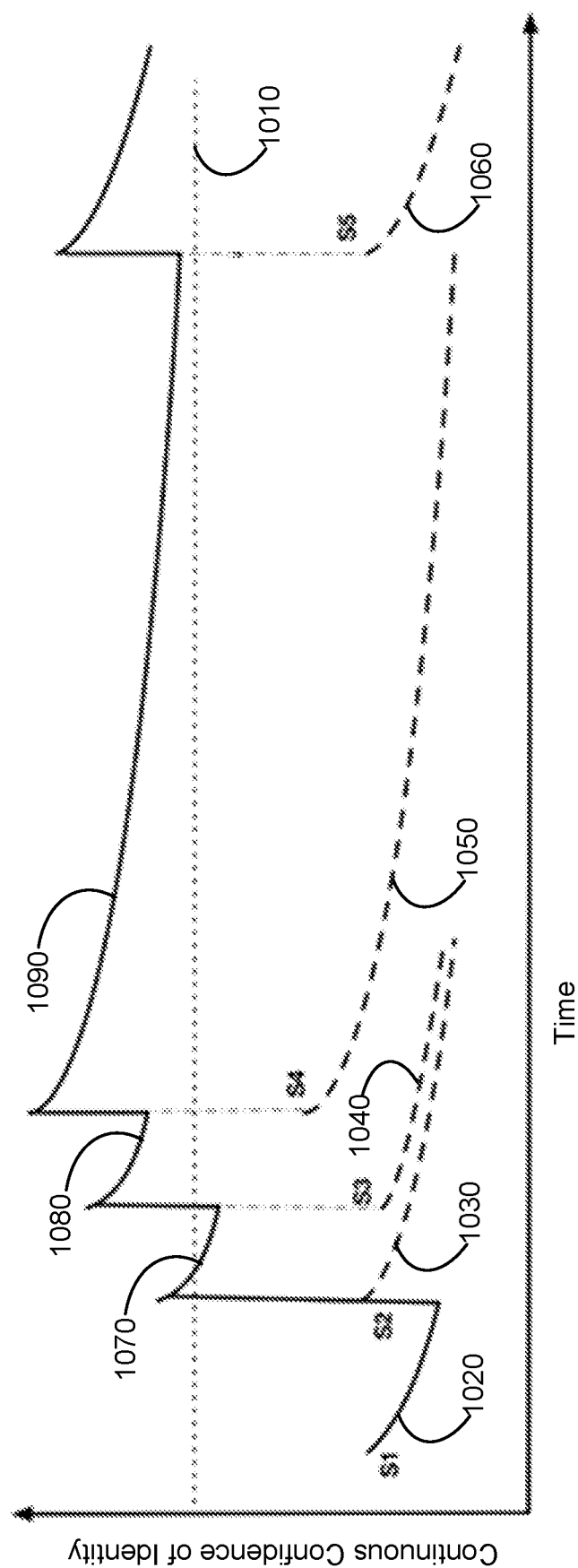
FIG. 10 illustrates an analysis for evaluating an aggregate identity confidence at a threshold confidence, according to one embodiment.

FIG. 10 illustrates an analysis for evaluating an aggregate identity confidence at a threshold confidence, according to one embodiment. In the illustrated analysis, each of decaying identity confidence values 1020, 1030, 1040, 1050, and 1060 are generated by a different, independent identity confidence model (e.g., S1, S2, S3, S4, and S5, respectively). When processed individually against an operational security threshold 1010, each of the decaying identity confidence values fails to satisfy the threshold. However, when identity confidence values 1020 and 1030 are combined by the identity combination module 240 into an aggregated identity confidence 1070, the aggregated identity confidence 1070 initially satisfies the threshold 1010, before decaying below the threshold. When the aggregated identity confidence value 1070 is updated by the additional combination of identity confidence value 1040, the updated identity confidence value 1080 remains above the threshold for the entirety of the identity block. Accordingly, while the identity confidence values generated by each model may independently be insufficient to grant a target user access to an operational context, an aggregate identity confidence 1080 determined based on the combination of identity confidence values 1020, 1030, and 1040 confirms the identity of the target user with enough confidence to grant the target user access to the operational context for the entire period of time associated with the aggregate identity confidence 1080.

In addition to the techniques described above, the identity combination module 240 may combine decaying identity confidence values which represent different conclusions about a target user's identity to determine an aggregate identity confidence for the target user. Based on data recorded for a single identity block, the identity computation module 230 may generate two identity confidence curves (representing decaying identity values): a confirmationconfidence curve, for example the curve illustrated in FIG. 10, indicating a likelihood that the motion data represents the target user and a rejection risk curve that the motion data does not represent the target user and a rejection risk curve indicating that the motion data represents behavior inconsistent with the target user and. In view of the rejection risk curve, the identity computation module 230 may assign a level of risk to the motion data. The identity computation module 230 and the identity combination module 240 may implement a first machine-learned confidence model to generate the confirmation confidence curve and a second, difference machine-learned rejection model to generate the rejection risk curve.

Additionally, each confidence curve may be generated using different sets of data recorded from different sources. For example, a confirmation confidence curve indicating a likelihood that a target user is Jeff is generated based on motion data received from a mobile device and processed by a motion data model, whereas a rejection risk curve indicating a likelihood that a target user is not Jeff is generated based on Wi-Fi data processed by a Wi-Fi model.

Figure 11A:
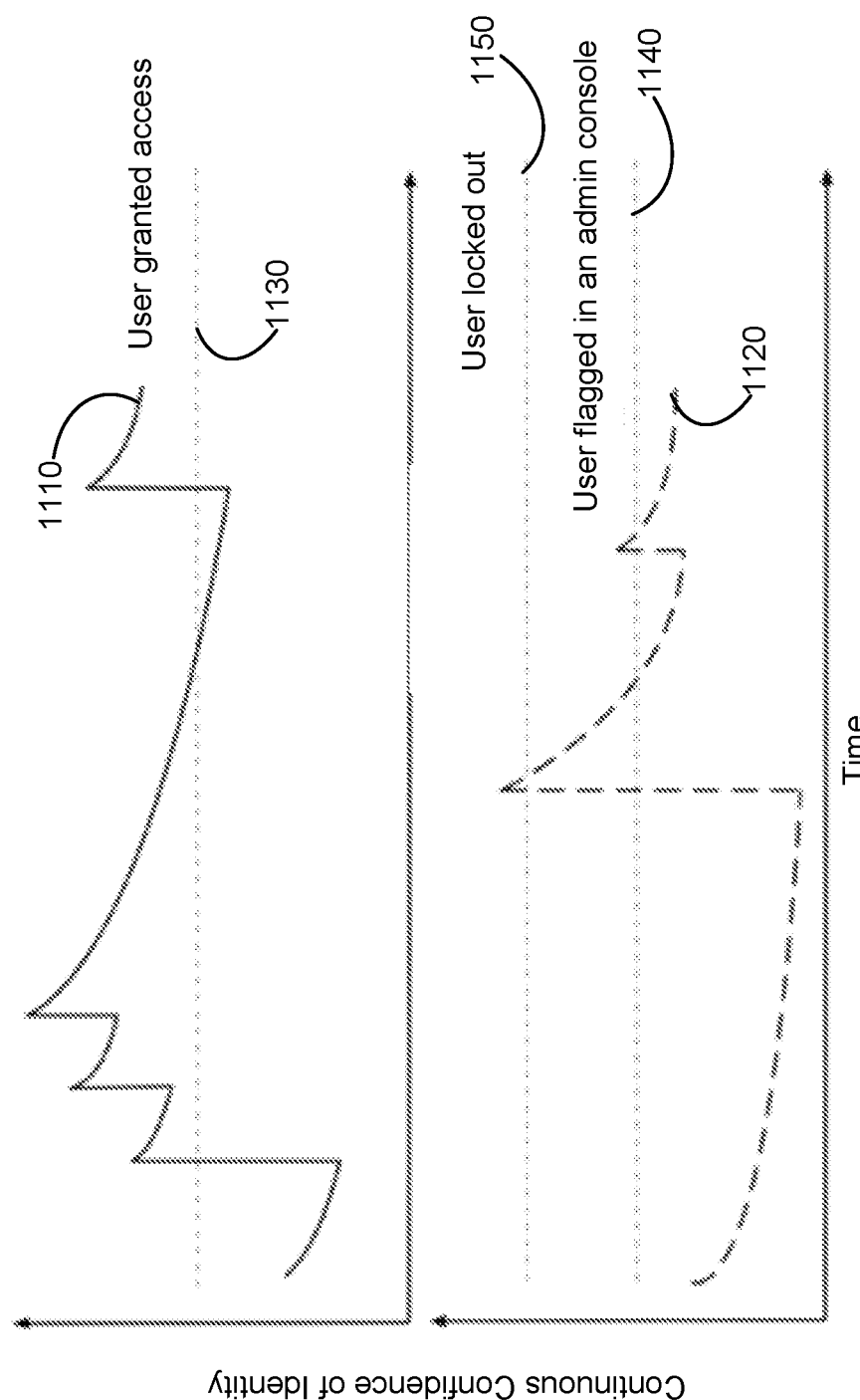
FIGS. 11A and 11B illustrate example implementations in which a confirmation confidence curve and a rejection risk curve may be processed simultaneously to verify a target user's identity, according to one embodiment
Figure 11B:
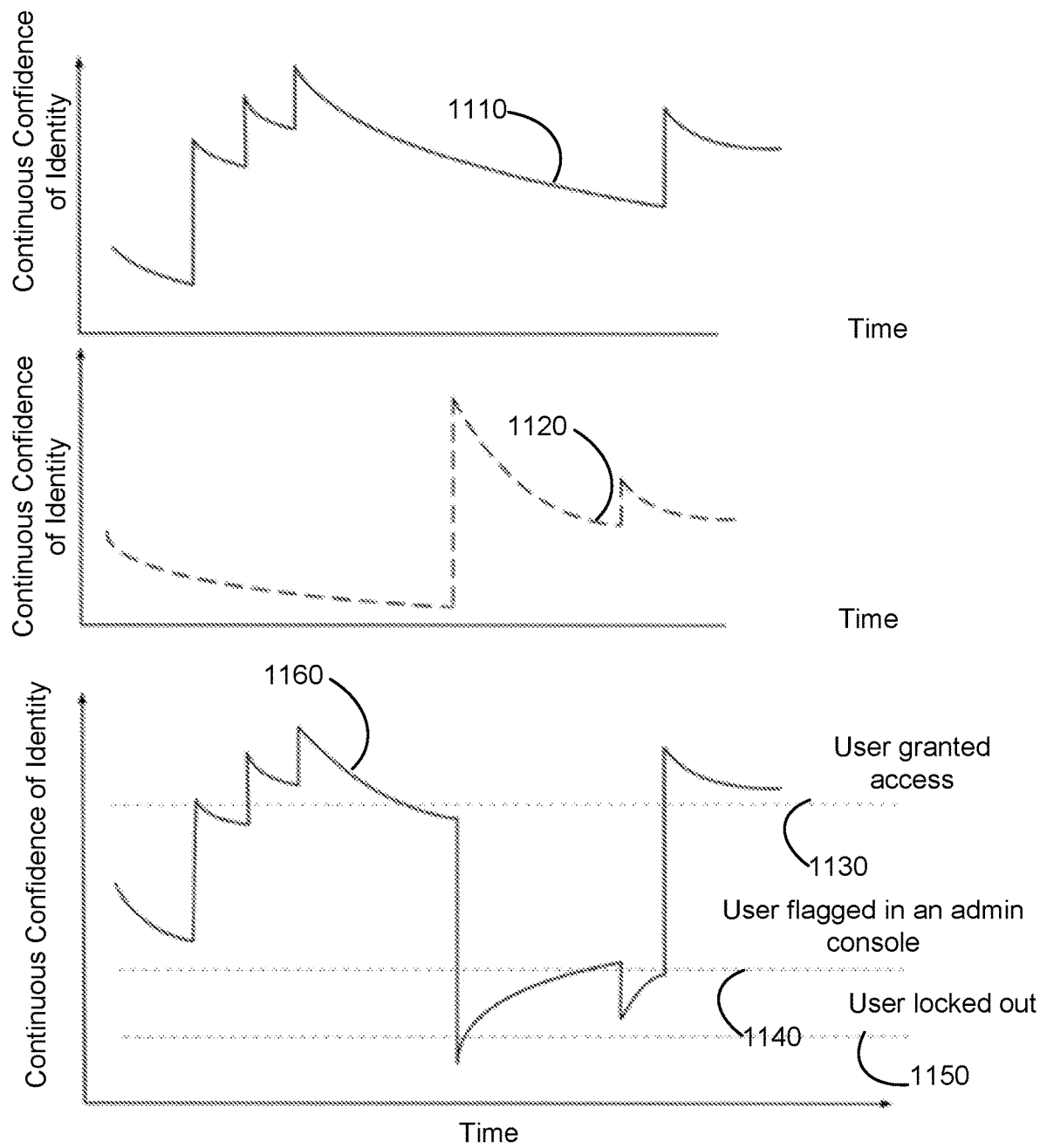

FIGS. 11A and 11B illustrate example implementations in which a confirmation confidence curve and a rejection risk curve may be processed simultaneously to verify a target user's identity, according to one embodiment. In a first implementation illustrated in FIG. 11A, the identity verification system 130 processes a confirmation confidence curve 1110 and a rejection risk curve 1120 separately. An enterprise system may consider identity confidence values on a rejection risk curve to be of greater importance than a corresponding identity confidence value on a confirmation confidence curve. Accordingly, despite an above threshold identity confidence value for a target user on a confirmation confidence curve 1110, such an enterprise system may deny access to the target user on the basis of a rejection risk curve 1120.

In an alternate embodiment, a rejection risk curve may represent a risk associated with a target user's behavior or activities. For example, a target user may be determined to be behaving different from their past behavior (e.g., using different doors from what they had in the past or behaving differently from the peers). Because such variations in behavior may represent a risk or at least a potential risk, a rejection risk curve may be generated using a trained machine learning model, a rule-based system, an external risk management system, or a combination thereof.

The confirmation confidence curve 1110 is evaluated based on a comparison against an operational security threshold 1130. Increasing identity scores on the confirmation confidence curve 1110 represent an increasing confidence in the target user's identity, whereas increasing risk scores on the rejection risk curve represent an increasing confidence that the target user's identity is incorrect (e.g., a decreasing confidence in the target user's identity) or that they are engaging in abnormal behavior. In some implementation, for example the implementation illustrated in FIG. 11A, the rejection risk curve 1120 may be evaluated against multiple conditional thresholds such as a first threshold 1140 and a second threshold 1150. For identity confidence values on the rejection risk curve 1120 above the threshold 1140, a target user may be flagged for manual review by an operator of the operational context or enterprise system. Based on the results of the manual review, the target user may or may not be granted access. In addition, they maybe flagged for future observations. For identity confidence values on the rejection risk curve 1120 above the threshold 1150, a target user may be denied access too or locked out of an access despite having an identity confidence value on the confirmation confidence curve 1110 that is higher than the threshold 1130.

In a second implementation illustrated in FIG. 11B, the identity verification system 130 may process a confirmation confidence curve 1110 and a rejection risk curve 1120 in combination to generate a holistic confidence curve 1130. Each identity value on the confirmation confidence curve 1110 and each identity value on the rejection risk curve may be assigned a weight which is factored into a holistic identity value on the holistic confidence curve 1130. Each holistic identity value may be determined by aggregating values on each curve 1110 and 1120, for example an average or weighted average, and each weight may be tuned based on the preferences or requirements of an enterprise system. A holistic confidence value on the curve 1160 may be compared to an operational security threshold. Accordingly, holistic confidence values determined to be above the threshold result in a target user being granted access, whereas holistic confidence values determined to be below the threshold result in a target user being denied access.

As described with reference to FIG. 11A, the confirmation confidence curve 1110 is compared against an operational security threshold 1130 and the rejection risk curve 1120 is compared against thresholds 1140 and 1150. However, the holistic confidence curve 1160 is compared against a combination of thresholds 1130, 1140, and 1150. In the illustrated embodiment of FIG. 11B, increasing identity confidence values on the holistic confidence curve 1160 indicate an increasing confidence in the target user's identity. Accordingly, if an identity confidence value for a target user initially exceeds the threshold 1130 to enable access to an operational context, the identity confidence value may decay. As the identity confidence value decays below the threshold 1130, the target user may be flagged for review by an administrator of the operational context. As the identity confidence value continues to decay below threshold 1140, the target user may be locked out of the operational context.

The implementation of multiple conditional thresholds enables the enterprise system to respond to varying levels of confidence or varying levels of risk with different approaches tailored to the confidence or risk level. In the embodiment illustrated in FIG. 11A, if identity confidence values on the rejection risk curve 1120 increase above the threshold 1140, a potential risk notification may be communicated to an administrator via a dashboard on a computing device or to an external risk management system affiliated with the operational context. In the embodiment illustrated in FIG. 11B, a similar response may be elicited based on a decay of identity confidence values on the holistic confidence curve 1160 below the threshold 1140. In the embodiment illustrated in FIG. 11A, if identity confidence values on the rejection risk curve 1120 increase above the threshold 1150, a user may be locked out of the operational context for an indefinite or predetermined amount of time or until they confirm with high confidence their identity using a secondary authentication mechanism. In the embodiment illustrated in FIG. 11B, a similar response may be elicited based on a decay of identity confidence holistic values below the threshold 1150.

Authenticating an Identity for a Target User

Depending on an operational context and situational circumstances, different deep learning and machine-learning identity confidence models may perform at varying levels of accuracy for each user in an enterprise. Accordingly, the confidence evaluation module 250 may compare identity confidence values against one or more operational security thresholds including, but not limited to, a false match rate and a false non-match rate. Additionally, an identity confidence model may perform with different levels of accuracy for different users depending on various criteria including, but not limited to, a volume of data, partial tuning, and simpler or less accurate models. For example, when an identity confidence model is not fully tuned because of a lack of data, it may perform at a lower level of accuracy. Conventional systems may unknowingly implement underperforming models, resulting in an increased number of false positive and false negative authentications and an overall, inaccurate system. To that end, various techniques are described herein for determining whether an identity confidence model is not performing with enough accuracy and for adjusting or re-training the model to improve that accuracy. Accordingly, the confidence evaluation module 250 implements various techniques (described herein) to leverage measured performance metrics of an identity confidence model to make a reliable decision regarding authenticating a target user. The confidence evaluation module 250 may additionally leverage additional techniques described herein to make more reliable conclusions when insufficient volumes of characteristic data are available.

In one implementation, the confidence evaluation module 250 compares an aggregate identity confidence, for example aggregate identify confidence 950 computed by the identity combination module 240, against certain thresholds. As will be described below, evaluating the performance of individual identity confidence models against an operational security threshold for an operational context enables the confidence evaluation module 250 to determine whether or not to authenticate a target user. In some embodiments, the operational security thresholds include a false match rate and a false non-match rate. An effective identity verification system aims to reduce both the false match rate and the false non-match rate. In alternate embodiments, the confidence evaluation module 250 implements a simple threshold, for example a numeric aggregate identity confidence defined by an operator. In alternate embodiments, the confidence evaluation module 250 compares an aggregate identity confidence, for example aggregate identity confidence 950, against the same thresholds.

As described herein, a false match rate describes a frequency at which the confidence evaluation module 250 incorrectly concludes that the identity of user A is target user B. For example, in a false match, user A is incorrectly granted access to an operational context because the enterprise system incorrectly determines user A is a different target user who does have access. In one embodiment, the confidence evaluation module 250 determines a false match rate for an operational context according to Equation (4):

$$FMR = \frac{N_{FP}}{N_{FP} + N_{TN}} \quad (4)$$

where $N_{FP}$ represents a number of false positive authentications for the operational context and $N_{TN}$ represents a number of true negative authentications for the operational context.

As described herein, a false non-match rate describes a frequency at which the confidence evaluation module 250 concludes that the identity of user A is not user A. For example, in a false non-match, user A would have access to an operational context (e.g., a personal safe), but the enterprise system would not grant user A access because the system incorrectly believes user A to be a different target user. In one embodiment, the confidence evaluation module 250 determines a false non-match rate for an operational context according to Equation (5):

$$FNMR = \frac{N_{FN}}{N_{FN} + N_{TP}} \quad (5)$$

where $N_{FN}$ represents a number of false negative authentications for the operational context and $N_{TP}$ represents a number of true positive authentications for the operational context.

In one embodiment, the confidence evaluation module 250 computes a false match rate and a false non-match rate for each identity confidence model activated for an operational context, both of which may be implemented in a Bayesian network. Over an interval of time ($\gamma$), the identity verification system 130 uses a combination of several identity confidence models (e.g., $m_0, m_1 \ldots m_{m-1}$) to collect characteristic data (e.g., $d_0, d_1 \ldots d_{o-1}$) for a population of users (e.g., $u_0, u_1 \ldots u_{n-1}$) requesting access to operational contexts within an enterprise system. For each user, the characteristic data may be processed by a combination of identity confidence models, for example the identity confidence models described with reference to FIG. 9.

Figure 12:
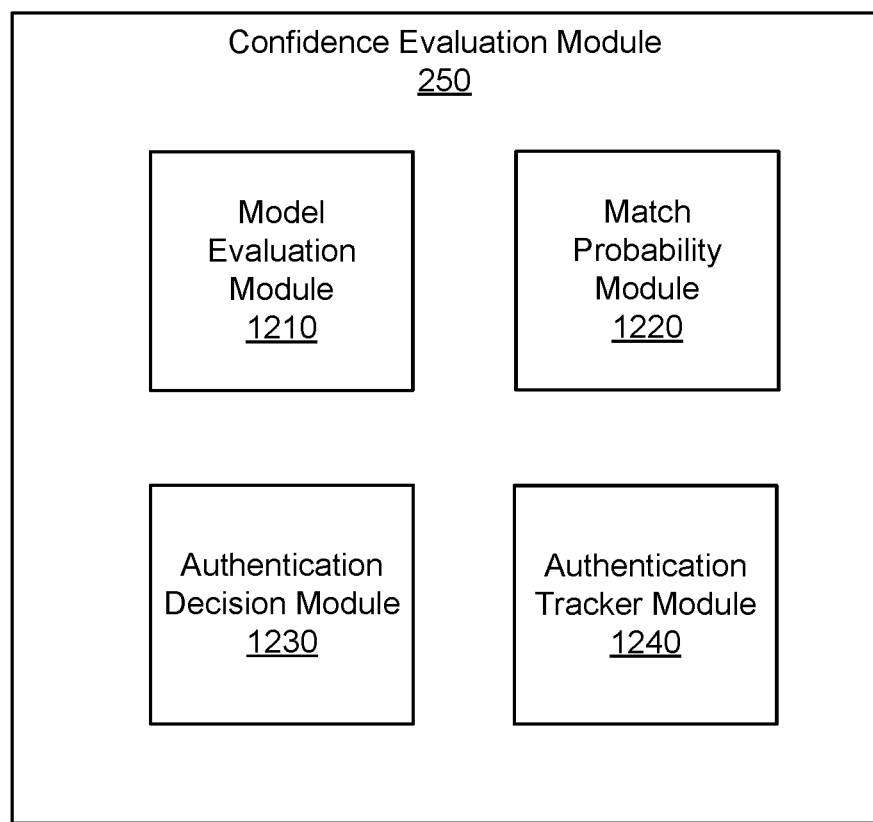
FIG. 12 is a block diagram of a system architecture of the confidence evaluation module, according to one embodiment.

FIG. 12 is a block diagram of a system architecture of the confidence evaluation module 250, according to one example embodiment. The confidence evaluation module 250 includes a model evaluation module 1210, a match probability module 1220, an authentication decision module 1230, and an authentication tracker module 1240. In some embodiments, the functionality of components in the confidence evaluation module 250 may be performed by the identity combination module 240. Similarly, in some embodiments, functionality of the confidence evaluation module 250 may be performed by the identity computation module 230. In some embodiments, the confidence evaluation module 250 includes additional modules or components.

As described above with reference to FIG. 9, the identity verification system 130 collects characteristic data for a population of users using a combination of sources. Characteristic data collected from each source is input to an identity confidence model specific to that source and the identity confidence model outputs an evaluation of the identity of a user, for example whether the user is an imposter posing as a different user. Accordingly, the model evaluation module 1210 characterizes the current performance of each identity confidence model based on characteristic data previously collected for a population of target users by the source specific the identity confidence model from. In particular, the model evaluation module 1210 computes at least a false positive rate, false negative rate, a true positive rate, and a true negative rate using defined weighting parameters $\beta_1$, $\beta_2$, and $\theta$. As described herein, the weighting parameters are defined to minimize the computation time required for the model evaluation module 1210 to evaluate the performance of an identity confidence model. $\beta_1$ may be defined as a value n times smaller than the value of $\beta_2$, where n is the number of users in an enterprise, for example a building or a campus. $\beta_2$ may be defined as a value between 0.1 and 1, where values near 0.1 represent larger enterprises (i.e., a larger number of users) and values near 1 represent smaller enterprises. $\Theta$ represents a decision boundary defined for the identity confidence model being evaluated.

For clarity, the user from whom characteristic data is collected is referred to as a requesting target user $u_r$ and the identity represented by the authentication credentials is referred to as an authenticating identity $u_k$. Described differently, an authenticating identity is the identity being confirmed by the identify verification system. For example, if user John is attempting to gain access to an operational context using the authentication information of user Jeff, user John is designated as the requesting target user $u_r$ and user Jeff is designated as the authenticating identity $u_k$. In the above example, the confidence evaluation module 250 would not authenticate the requesting target user, John, and would not grant access to the operational context. As another example, if user John is attempting to gain access to an operational context using his own authentication information, John would be the identity of both the requesting target user $u_r$, and the authenticating identity $u_k$. In this example, the confidence evaluation module 250 would authenticate requesting target user John and would grant access to the operational context.

For each authenticating identity $u_k$, each day t, and for each model $m_l$, the model evaluating module 1210 computes the following four variables. Based on characteristic data input to an identity confidence model ($m_l$) for a requesting target user ($u_r$), on each day (t), the model evaluation module 1210 initializes a false positive count ($FP_{k,t,l}$), a true negative count ($TN_{k,t,l}$), a true positive count ($TP_{k,t,l}$), and a false negative count ($FN_{k,t,l}$) to zero. When the requesting target user ($u_r$) attempts to gain access to an operational context, the model evaluation module 1210 may choose to determine that the identity of the requesting target user $u_r$ does not match an authenticating identity $u_k$, or determine that the identity of the requesting target user $u_r$ does match an authenticating identity $u_k$. The module evaluation module 1210 evaluates characteristic data collected for a requesting target user to determine whether the identity of the requesting target user matches an authenticating identity.

In the first case described above where the identity of a requesting target user does not match an authenticating identity, the model evaluation module 1210 computes a non-match confidence score, for example using Equation (6):

$$S_{r \neq k} = 1_{0:\beta 1}(\alpha) M_l(d_r) \quad (6)$$

where $S_{r \neq k}$ represents the non-match confidence score, $1_{0:\beta 1}(\alpha)$ represents a characteristic function based on the weighting parameter $\beta_1$, $\alpha$ is a random value generated between 0 and 1, and $M_l(d_r)$ represents an identity confidence value output by an identity confidence model l based on characteristic data collected for a requesting target user $u_r$. In some embodiments, the identity confidence value output by a model $M_l$ is conditioned such that an identity confidence value of zero is substituted with a value $\epsilon < \theta$). In one embodiment, the characteristic function may be characterized based on the following conditions:

$$1_{0:\beta}(\alpha) = \begin{cases} 1, & 0 < \alpha < \beta \\ 0, & \text{otherwise} \end{cases}$$

The model evaluation module 1210 compares the computed non-match confidence score to the weighting parameter $\theta$, which acts as a model-specific threshold. If the score is greater than $\theta$, the model evaluation module 1210 incrementally increases the false positive value, for example an incremental increase of 1. If the non-match score is less than or equal to $\theta$, but greater than 0, the model evaluation module 1210 incrementally increases the true negative value by 1.

In the second case described above where the identity of a requesting target user does match an authenticating identity, the model evaluation module 1210 computes a match confidence score, for example using Equation (7):

$$S_{r=k} = 1_{0:\beta 2}(\alpha) M_l(d_r) \quad (7)$$

where $S_{r=k}$ represents the match confidence score, $1_{0:\beta 2}(\alpha)$ represents the characteristic function described above, $\alpha$ is a random value generated between 0 and 1, and $M_l(d_r)$ represents an identity confidence value output by an identity confidence model l based on characteristic data for a requesting target user $u_r$. Consistent with the embodiment discussed above, the identity confidence value output by the model $M_l$ may be conditioned such that an identity confidence value of zero is substituted with a value $\epsilon < \theta$).

The model evaluation module 1210 compares the computed match confidence score to the weighting parameter $\theta$. If the match score is greater than $\theta$, the model evaluation module 1210 incrementally increases the true positive value, for example an incremental increase of 1. If the match score is less than or equal to $\theta$, but greater than 0, the model evaluation module 1210 incrementally increases the false negative value by 1.

After processing characteristic data recorded during designated period of time ($\gamma$) and updating the false positive count, the true negative count, the true positive count, and the false negative count for each identity confidence model, the model evaluation module 1210 computes the false match rate and the false non-match rate for an authenticating identity based on the characteristic data input to the identity confidence model l. Accordingly, Equation (5) and Equation (6) can, respectively, be rewritten as Equation (8) and Equation (9):

$$FMR_{k,l} = \frac{\sum_{t=t_0}^{t_\gamma - 1} FP_{k,t,l}}{\sum_{t=t_0}^{t_\gamma - 1} FP_{k,t,l} + \sum_{t=t_0}^{t_\gamma - 1} TN_{k,t,l}} \quad (8)$$

$$FNMR_{k,l} = \frac{\sum_{t=t_0}^{t_\gamma - 1} FN_{k,t,l}}{\sum_{t=t_0}^{t_\gamma - 1} FN_{k,t,l} + \sum_{t=t_0}^{t_\gamma - 1} TP_{k,t,l}} \quad (9)$$

Although not described herein, a person having ordinary skill in the art would recognize that both false match rates and false non-match rates may be computed using any other applicable statistical or mathematical techniques.

As described above, for embodiments where one or more identity confidence models are active in authenticating characteristic data collected for a single requesting target user, the confidence evaluation module 250 may leverage a Bayesian network. Based on the false match rates and false non-match rates determined for each active identity confidence model, the match probability module 1220 determines whether to authenticate a requesting target user for an operational context. In one implementation, the match probability module 1220 determines a probability that the identity of a requesting target user actually matches an authenticating identity using a conditional probability distribution for each active identity confidence model.

To determine a conditional probability distribution, the match probability module 1220 categorizes the performance for each identity confidence model $M_l$, into one of four scenarios where a requesting user ($u_r$) requests access to an operational context using an authenticating identity ($u_k$): 1) the identity confidence model correctly concludes that the identity of a requesting target user matches an authenticating identity, 2) the identity confidence model incorrectly concludes that the identity of a requesting target user matches an authenticating identity, 3) the identity confidence model incorrectly concludes that the identity of a requesting target user does not match an authenticating identity, and 4) the identity confidence model correctly concludes that the identity of a requesting target user does not match an authenticating identity. The conditional probabilities for each scenario may be modeled based on the following Equations (10) to (13):

Scenario 1: $CPD=1-FNMR_{k,I}$ (10)

Scenario 2: $CPD=FMR_{k,I}$ (11)

Scenario 3: $CPD=FNMR_{k,I}$ (12)

Scenario 4: $CPD=1-FMR_{k,I}$ (13)

Based on the performance of an identity confidence model for a requesting target user (modeled by the conditional probability distribution) and an identity confidence value generated by the identity confidence model, the match probability module 1220 computes a match probability. As described herein, a match probability represents a likelihood that an identity of a requesting target user matches an authenticating identity. The match probability for a requesting target user is determined based on characteristic data collected for the requesting target user and identity confidence values generated by all identity confidence models activated for the operational context. As discussed above, the identity confidence values generated by the identity computation module 230 characterize a likelihood that a requesting target user is a match with an authenticating identity based on collected characteristic data. In comparison, the match probability characterizes the likelihood that a requesting target user is a match with an authenticating identity (similar to the identity confidence value) that is adjusted based on the performance of each active identity confidence model. The match probability module 1220 determine the match probability using techniques including, but not limited to, Bayesian inference using Gibbs Sampling, Markov chain Monte Carlo sampling, and loopy belief propagation.

The authentication decision module 1230 compares the computed match probability to a threshold, for example an operational security. The threshold may be defined manually by a qualified human operator of the enterprise system or may be derived based on the false match rate and/or the non-false match rate determined for an identity confidence model activated for an operational context. In one embodiment, if the match probability is greater than the operational security threshold, the authentication decision module 1230 confirms that the identity of a requesting target user matches an authenticating identity and grants the requesting target user access to an operational context. The identity verification system may grant the requesting target user in an umber of ways, for example by automatically opening a locked door in the operational context, unlocking an electronic safe in operational context, presenting a secured asset to the requesting target user, or allowing the requesting target user access to a secure digital server or secured data on a digital server Alternatively, if the match probability is less than or equal to the operational security threshold, the authentication decision module 1230 may provide instructions to the secondary authentication module 260 described with reference to FIG. 2 to activate another identity confidence model or to authenticate the requesting target user using an alternate mechanism. In embodiments where the secondary authentication module 260 activates another identity confidence model, the identity verification system may begin to collect additional characteristic data using new sources associated with newly activated identity confidence model. The confidence evaluation module 250 may repeat the steps and techniques described above in view of the additional characteristic data to compute an updated match probability. The process may be repeated until a match probability is reached that exceeds the operational security threshold. If all available confidence models are activated and the match probability is still less than the operational security threshold, the authentication decision module 1230 denies the requesting target user access to the operational context. Alternatively, or in addition to the technique described above, the authentication decision module 1230 may provide instructions to the secondary authentication module 260 to request biometric data. In such an implementation, the confidence evaluation module 260 computes a false match rate and a false non-match rate for a biometric data model. If the match probability of the biometric data along with the rest of the models, does not exceed the operational security threshold, the authentication decision module 1120 denies the request target user access to the operational context.

Additionally, as described above with reference to FIGS. 6 and 7, identity confidence values may decay over time, for example as a target user remains within an operational context for an extended period of time. When an identity confidence value decays below an operational security threshold, the identity verification system 130 prompts a user to re-authenticate themselves to retain their access to the operational context. Accordingly, in some embodiments, the match probability module 1220 continuously computes a match probability for a requesting target user as a function of time. To do so, the match probability module 1220 re-computes the conditional probability distribution for an identity confidence model ($m_l$) as a function of a decay parameter ($\xi_l$). Because the conditional probability distribution is determined as a function of a false match rate and false non-match rate for an identify confidence model, for example as described in Equations (10)-(13), the match probability module 1220, computes a decaying false match rate and a decaying false non-match rate for the confidence model ($m_l$), for example according to the Equations (14) and (15) respectively:

$FMR_{k,I,0}=FMR_{k,I}$ $FNMR_{k,I,0}=FNMR_{k,I}$ $FNMR_{k,I,t+1}=0.5-(0.5-FNMR_{k,I,t})\xi_l$ (14)

$FMR_{k,I,t+1}=0.5-(0.5-FMR_{k,I,t})\xi_l$ (15)

Additionally, the match probability module 1220 may recognize that requests for access to operational contexts carry varying levels of risk depending on the circumstances associated with the operational context. For example, a request for access to an asset from within the perimeter of an enterprise entails a different level of risk than a request for the same access from outside the enterprise or from an untrusted nation or area. As another example, characteristic data collected from a cell phone or a wearable of a target user may be associated with a different level of risk than other sources of characteristic data. Accordingly, depending on the operational context and the level of risk associated with the operational context, the match probability module 1220 may adjust the computed conditional probability distribution each identity confidence model activated for the operational context by a risk parameter $\zeta$. As described herein, the match probability module 1220 may calculate the risk parameter using empirical methods when sufficient data is available. For example, $\zeta$ may be determined for an enterprise based on a comparison, for example a ratio, of mobile devices stolen inside the enterprise versus mobile devices stolen outside the enterprise. Alternatively, when sufficient data is unavailable, the match probability module 1220 may determine $\zeta$ manually using estimation techniques.

The risk parameter may be a value greater than 1 chosen based on the expected degree of increased risk. The match probability module 1220 may use the risk parameter as a multiplier to adjust the conditional probability distribution of an identity confidence model. When applied, a risk parameter may adjust Equations (10) to (13) described above according to Equations (16) to (19): In a separate embodiment, two risk parameters $\zeta$ may be chosen to modulate FMR and FNMR separately.

Scenario 1: $CPD = 1 - \zeta FNMR_{k,l}$ (16)

Scenario 2: $CPD = \zeta FMR_{k,l}$ (17)

Scenario 3: $CPD = \zeta FNMR_{k,l}$ (18)

Scenario 4: $CPD = 1 - FMR_{k,l}$ (19)

It is noted the risk parameter $\zeta$ may be applied using any suitable alternative technique. For example, the risk parameter may be applied by computing the prior probability of a compromised device (e.g., a device or sensor that is not in the possession of an appropriate user) in a Bayesian estimation. In such an implementation, $p_1 = \zeta p_0$ represents the prior probability of the device or sensor, where $p_0$ is the default prior. Algorithms including, but not limited to, Loopy Belief Propagation and Clique Tree Algorithm, may be implemented to determine the Bayesian estimation using $\rho$ to compute the prior probability, rather than modifying the CPD as described with reference to Equations 16-19.

In alternate embodiments, the confidence evaluation module 250 may implement an arbitrarily low false match rate for an identity confidence model and augment the FMR threshold with a combination of a false acceptance rate and a false rejection rate. In addition to or as an alternative to the techniques and processes described above, the confidence evaluation module 250 may implement any other suitable or computationally appropriate techniques to determine a conditional probability distribution for an identity confidence model.

In most operational contexts, a requesting target user is granted access for a limited period of time, which may range from several seconds to several minutes depending on the operational context. At the conclusion of such a period of time, a requesting target user is required to re-authenticate themselves for continued access to the operational context. In some embodiments, the period of time is defined as a 30 second interval. Accordingly, the authentication tracker module 1240 tracks time elapsed since a requesting target user was last authenticated for access to an operational context and, at the conclusion of each period, instructs the model evaluation module 1210, the match probability module 1220, and the authentication decision module 1230 to repeat the techniques described above to re-authenticate the requesting target user.

As described herein, a time at which a requesting target user was last granted access to an operational context additionally represents the most recent time when the identity of the requesting target user was confirmed with a high confidence. In one implementation, the match probability module 1220 continuously monitors the match probability of a requesting target user based on data received from that requesting target user and the authentication tracker module 1240 confirms with high confidence that the identity of the requesting target user matches an authenticating identity while the match probability continues to be greater than the threshold. As long as the match probability continues to be greater than the threshold, the requesting target user continues to have access to the operational context. Alternatively, if the match probability falls below the threshold, the authentication tracker module 1240 requests that the requesting target user be re-authenticated to re-gain access to the operational context. If the requesting target user is successfully re-authenticated by the authentication decision module 1230, the authentication tracker module 1240 grants them access to the operational context.

Additionally, as described herein, at the conclusion of a period of time, the confidence in the identity of a requesting target user is reset to a default low confidence value. Accordingly, the authentication tracker module 1240 interprets the conclusion of the period of time as a signal to re-authenticate the requesting target user. The match probability module 1220, the authentication decision module 1230, and the authentication tracker 1240 repeat the techniques described above to re-authenticate the identity of the requesting target user. In some embodiments, an identity confidence value determined for a requesting target user may be inversely related with time. More specifically, as the period of time extends, the confidence value may decrease from its initial high confidence to a below threshold low confidence at the conclusion of the period.

The model evaluation module 1210 may implement the techniques described above at a frequency that is independent of other components of the confidence evaluation module 250 (e.g., the match probability module 1220, the authentication decision module 1230, and the authentication tracker module 1240). The model evaluation module 1210 may periodically evaluate the performance of identity confidence models, independent of how often a requesting target user requests access to an operational context. For example, requesting target users may typically request access to an operational context once every 20 minutes, but the model evaluation module 1210 may evaluate identity confidence models weekly based on the all collected characteristic data for that week.

The techniques described above with reference to FIG. 12 may be implemented in offline situations to support an enterprise system that is disconnected from the internet (or from other branches of the enterprise system), for example during a power outage or a situation where an employee's computing devices are disconnected from a network. In such instances, the identity verification system 130 identifies a subset of confidence models capable of processing data while offline, for example on a server running in the enterprise or on a phone or laptop. During such offline implementations, the confidence evaluation module 250 processes characteristic data using any identified and available identity confidence models using the techniques and procedures described above.

Figure 13:
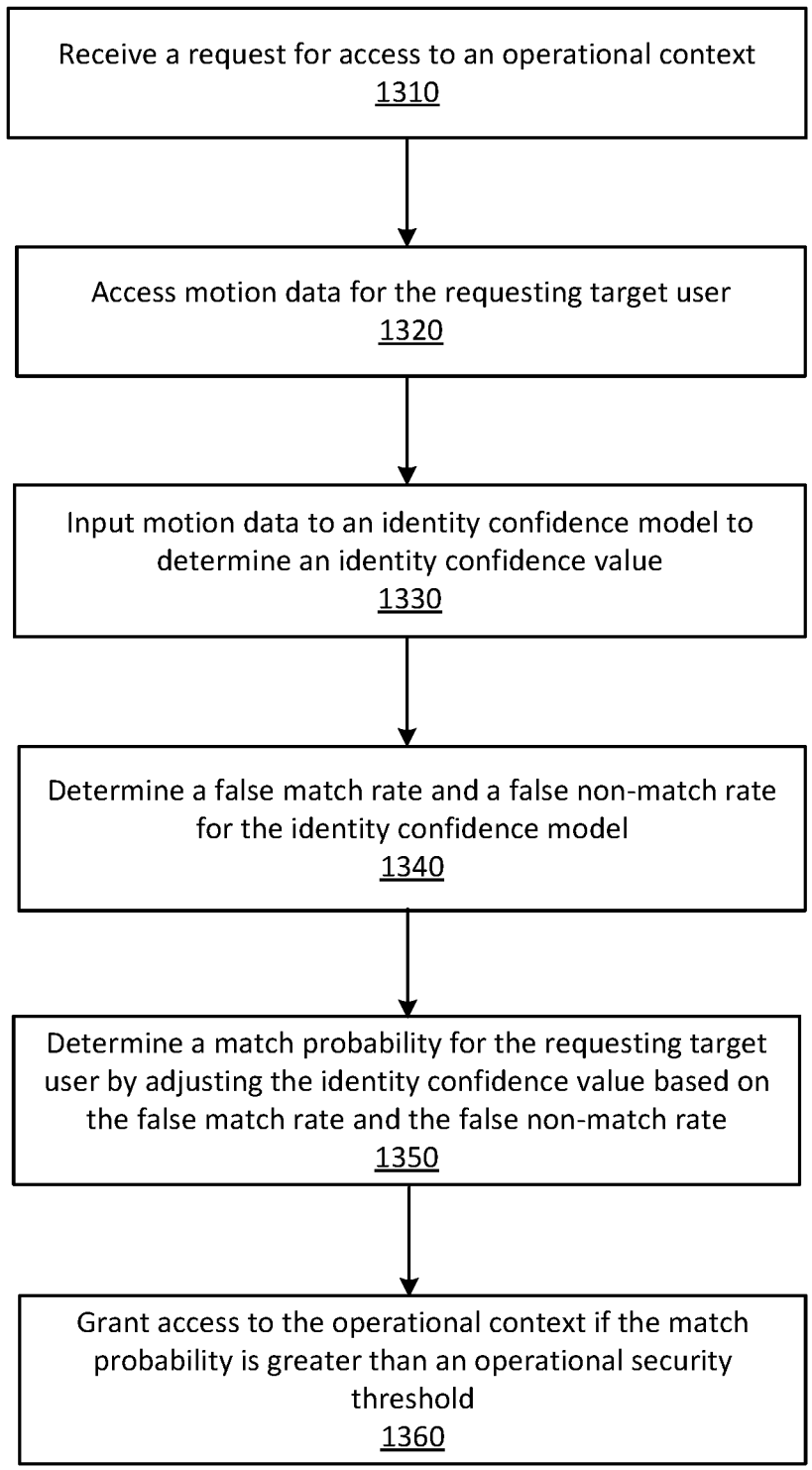
FIG. 13 illustrates a process for determining to grant a user access to an operational context, according to one embodiment.

FIG. 13 illustrates a process for determining to grant a user access to an operational context, according to one embodiment. The identity verification system 130 receives a request from a requesting target user for access to an operational context. As part of the request, the requesting target user offers authentication credentials in order to obtain such access. The authentication credentials encode an authenticating identity which will be compared against the identity of the requesting target user to determine if granting access would be appropriate. To that end, the identity verification system 130 accesses 1320 characteristic data collected for the requesting target user during a period of time leading up to their request for access. As described above, the characteristic data is representative of the identity of the requesting target user.

To determine whether to grant access to the requesting target user, the identity verification system 130 inputs 1330 characteristic data to an identity confidence model, for example the identity confidence model 510. In some embodiments, the identity confidence model is trained based on characteristic data collected by a particular source or type of source. The identity confidence model outputs an identity confidence value, which describes a likelihood that the identity of the requesting target user matches the authenticating identity encoded in the authentication credentials. The identity verification system 130 additionally determines 1340 a false match rate and false non-match rate for the identity confidence model based on characteristic data collected during a preceding period of time. As discussed above, the false match rate describes a frequency at which identity verification system 130 incorrectly concludes that the identity of user A is target user B and the false non-match rate describes a frequency at which the identity verification system 130 concludes that the identity of user A is not user A. Accordingly, the false match and the false non-match rate characterize the accuracy, or performance, of the identity confidence model.

The identity verification system 130 determines 1350 a match probability for the requesting target user by adjusting the identity confidence value based on the determined false match rate and false non-match rate. Accordingly, the match probability represents a more accurate likelihood that the identity of the requesting target user matches the authenticating identity than the identity confidence value. If the match probability is greater than an operational security threshold, the identity verification system 130 grants 1360 the requesting target user access to the operational context. The identity verification system 130 may grant the requesting target user access in any suitable manner, for example by automatically opening a locked door in the operational context, unlocking an electronic safe in operational context, presenting a secured asset to the requesting target user, or allowing the requesting target user access to a secure digital server or secured data on a digital server.

The discussion above with reference to FIG. 13 may also be applied to implementations where the identity verification system implements multiple identity confidence models, for example using the techniques discussed above.

Evaluating Performance of an Identity Confidence Model

Figure 14:
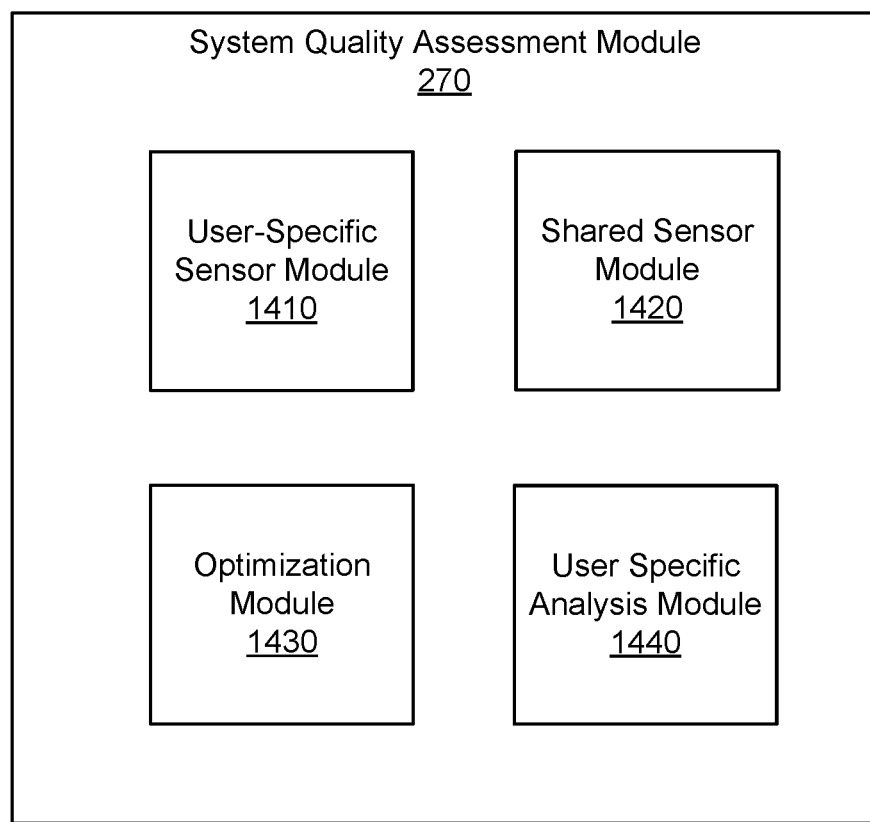
FIG. 14 is a block diagram of a system architecture of the system quality assessment module, according to one embodiment.

FIG. 14 is a block diagram of a system architecture of the system quality assessment module 270, according to one embodiment. The system quality assessment module 270 includes a user-specific module 1410, a shared sensor module 1420, an optimization module 1430, and a user specific analysis module 1440. In some embodiments, the functionality of components in the system quality assessment module 270 may be performed by the confidence evaluation module 250. In some embodiments, the system quality assessment module 270 includes additional modules or components.

Conventionally, when a third-party evaluator measures performance metrics for a traditional authentication system, they recruit a population of individuals (e.g., individuals $u_1 \ldots u_n$) who satisfy the authentication requirements for an operational context. For example, if access to an operational context requires authentication via an iris scanning biometric system, such authentication requirements may include individuals who are not blind or do not have any eye-related medical issues. From the perspective of the evaluator, each individual is a source of a finite amount (d) of sensor data. Accordingly, the evaluator receives $n_d$ measurements, which are run through the authentication system for an operational context. The success of each measurement is recorded as a success or a failure and the evaluator determines a false acceptance rate and a false rejection rate for the operational context based on the recorded successes and failures. In some embodiments, the computed measurements may additionally be evaluated using a confidence interval. This process must be performed manually during a period of time reserved for the evaluation of the authentication system and must be tediously supervised by a human operator.

However, a passive system, for example the user identification system 130, continuously collects real-time characteristic data from actual target users located within an enterprise system. For example, the user identification system 130 continuously collects characteristic data whenever a user enters an enterprise or comes within a defined proximity of an enterprise without the user having to manually trigger or activate any of the sensors responsible for collecting the characteristic data. Accordingly, compared to convention authentication system described above, performance metrics of a passive system may be evaluated using the techniques described herein without supervision by a manual operator and while the system continues to authenticate target users. Accordingly, the system quality assessment module 270 recognizes two types of sensor: 1) a sensor or sensing device with a one-to-one mapping to a user and 2) sensor or sensing device that is not uniquely mapped to a target user, for example a security camera or a shared computer.

As described herein, sensors and sensing devices involved in the first implementation are referred to as user-specific sensors. User-specific sensors continuously collect characteristic data for a particular user. To evaluate the performance of user-specific sensors, the user-specific sensor module 1410 considers that at a time (t) a user-specific sensor within an enterprise system ($u_i$) collects characteristic data ($d_{i,t}$) for a specific user. Such data is collected for each user within the enterprise system during the period of time T. For each user, the characteristic data recorded by a user-specific sensor is processed by an identity confidence model corresponding to the user-specific sensor to generate an authentication result $A(u_i, d_{i,t})$. Based on the actual identity of the target user and whether or not they were granted access, the authentication result may be a true positive authentication, false positive authentication, a true negative authentication, or a false negative authentication. As described herein, an authentication result $A(u_i, d_{i,t})$ represents an evaluation of characteristic data collected for a requesting target user i at time t using an identity confidence model for an authenticating identity l. Described differently, the authentication result indicates whether a target user was granted access to the operational context. The count of virtual positive authentications may be determined as a sum of all true positive and false positive authentications. Similarly, the count of virtual negative authentications may be determined as a sum of all true negative and false negative authentications. Accordingly, the system quality assessment module 270 may maintain a count of true positive authentications, a count of false negative authentications, and a count of true negative authentications that have been determined and updated based on a history of history of characteristic data collected by sensors during a preceding period of time and a record of authentication results generated during that preceding period of time. Finally, the user-specific sensor module 1410 computes a false acceptance rate for an identity confidence model according to Equation (20) and a false rejection rate for an identity confidence model according to Equation (21):

$$FAR = \frac{N_{FP}}{N_{FP} + N_{TN}} \quad (20)$$

where FAR represents a false acceptance rate measurement, $N_{FP}$ represents a count of false positive authentications by the identity confidence model and $N_{TN}$ represents a count of true negative authentications by the identity confidence model and $$FRR = \frac{N_{FN}}{N_{FN} + N_{TP}} \quad (21)$$

where FRR represents a false rejection rate measurement, $N_{FN}$ represents a count of false negative authentications by the identity confidence model and $N_{TP}$ represents a count of true negative authentications by the identity confidence model. Accordingly, the false acceptance rate describes a frequency with which the authentication result incorrectly granted users access to the operational context and the false rejection rate describes a frequency with which the authentication result incorrectly denied users access to the operational context.

As described herein, sensors and sensing devices involved in the second implementation are referred to as shared sensors. A shared sensor continuously collects characteristic data simultaneously for multiple users. To evaluate the performance of a shared sensor, the shared sensor module 1420 receives characteristic data collected for a target user by shared sensors, for example a computer that is shared between multiple people or a security camera mounted in a high-traffic hallway. To evaluate the performance of identity confidence models corresponding to shared sensors, the shared sensor module 1420 accesses a probability value $p(u_i, d_{lt})$ computed by the identity computation module 250 for a characteristic data collected by a particular sensor l, hereafter referred to as a sensor-assigned probability value. A sensor-assigned probability value describes a probability that characteristic data collected by a sensor l was collected for a user i, for example a requesting target user. A sensor-assigned probability value may be computed using data stored in other enterprise data stores. For example, for a computer that is shared amongst multiple users, the device-assigned probability value may be estimated by looking at device checkout records. In addition to the techniques described above with reference to FIG. 5, an identity confidence value may be computed using temporal behavior models trained for a user or any other suitable computational techniques.

Additionally, the shared sensor module 1420 determines an authentication result for each requesting target user for an operational context, which may be a true positive authentication, false positive authentication, a true negative authentication, or a false negative authentication. In one embodiment, the determined authentication result is assigned or encoded as a binary value, where one value represents a successful authentication and the other represents an unsuccessful authentication.

Based on a sensor-assigned probability value $p(u_i, d_{lt})$ and authentication results for determined each requesting user captured in characteristic data collected by a shared sensor, the shared sensor module 1420 determines a count of true positives according to Equation (22), a count of false positives according to Equation (23), a count of true negatives according to Equation (24), and count of false negatives according to Equation (25):

$$TP = \Sigma_{u_i, d_{lt}} p(u_i, d_{lt}) A(u_i, d_{lt}) \quad (22)$$

$$FP = \Sigma_{u_i, d_{lt}} (1 - p(u_i, d_{lt})) A(u_i, d_{lt}) \quad (23)$$

$$TN = \Sigma_{u_i, d_{lt}} (1 - p(u_i, d_{lt}))(1 - A(u_i, d_{lt})) \quad (24)$$

$$FP = \Sigma_{u_i, d_{lt}} p(u_i, d_{lt}))(1 - A(u_i, d_{lt})) \quad (25)$$

Using Equations (22) to (25), the shared sensor module 1420 computes or updates a false acceptance rate according to Equation (20) and a false rejection rate according to Equation (21).

Depending on the volume of characteristic data collected by a user-specific sensor or a shared sensor, computational costs for processing all collected characteristic data may be expensive and time-consuming. Accordingly, the optimization module 1430 may sample a smaller, optimized amount of any collected characteristic data, according to $\beta_1$ and $\beta_2$. $\beta_2$ and $\beta_1$ are factors that are defined to allow for control of numbers of imposters and true access separately. In common embodiments, $\beta_2$ is less than $\beta_1$ by a factor of number of users or more. Consistent with the description of the random variable a described above with reference to FIG. 12 and the model evaluation module 1210, Equations (22) to (25) may be adjusted to accommodate the optimized amount of characteristic data according to equations (26) to (29):

$$TP = \Sigma_{u_i, d_{lt}} p(u_i, d_{lt}) A(u_i, d_{lt}) 1_{0:\beta 1}(\alpha) \quad (26)$$

$$FP = \Sigma_{u_i, d_{lt}} (1 - p(u_i, d_{lt})) A(u_i, d_{lt}) 1_{0:\beta 2}(\alpha) \quad (27)$$

$$TN = \Sigma_{u_i, d_{lt}} (1 - p(u_i, d_{lt}))(1 - A(u_i, d_{lt})) 1_{0:\beta 2}(\alpha) \quad (28)$$

$$FN = \Sigma_{u_i, d_{lt}} p(u_i, d_{lt}))(1 - A(u_i, d_{lt})) 1_{0:\beta 1}(\alpha) \quad (29)$$

Using Equations (26) to (29), the shared sensor module 1420 computes a false acceptance rate according to Equation (20) and a false rejection rate according to Equation (21).

As described above, the false acceptance rates and false rejection rates computed by the user-specific sensor module 1410, the shared sensor module 1420, and the optimization module 1430 are metrics for evaluating the overall performance of an identity verification system in an operational context. In addition to the description above, the performance of an identity verification system in an operational context may be expanded to also evaluate the performance of an identity verification system when authenticating a particular user. Rather than applying Equations (22) to (29) to characteristic data collected for all users in a population, the user specific analysis module 1440 may apply Equations (22) to (29) to process characteristic data collected for only a single requesting target user. Based on the resulting true positive, false positive, true negative, and false positive rates, the user specific analysis module 1440 determines a user-specific false acceptance and false rejection rate. In one embodiment, an identity confidence model receives characteristic data collected for a particular target user and generates an authentication result for that user. The user-specific analysis module 1440 maintains a false acceptance rate and a false rejection rate for the identity confidence model based on characteristic data previously collected for that particular user and previous authentication results recorded for the target user. As new characteristic data is collected and new authentication results are recorded for the particular target user, the user specific analysis module 1440 updates the false acceptance rate and false rejection for each identity confidence model when considering characteristic data collected for the particular target user. Accordingly, the user specific analysis module 1420 is able to continuously monitor the performance of individual identity confidence models on a per-user basis.

The techniques described above evaluate a user identification system based on assessments of their false acceptance rate and false rejection rate, each of which is determined at a per-attempt-level. As described herein, an attempt refers to a request from a target user for access to an operational context. A single attempt may additionally include a number of authentication attempts. For example, a target user activates a computer (the transaction), but the target user may need several attempts to correctly enter their authentication information before being granted access to information stored on the computer. Although the identity verification system 130 described herein is a passive system that that authenticates a user using automatically and continuously collected characteristic data (e.g., behavior data, video-based biometrics, voice data, keyboard data) rather than requesting that the user manually enter authentication information, the system quality assessment module 270 may evaluate the performance of the identity verification system 130 using such attempt-based metrics, for example the false match rate and the false non-match rate for an operational context.

The identity verification system 130 described above measures the performance of individual identity confidence models. However, the identity verification system 130 may evaluate the performance of an entire enterprise system involving a combination of identity confidence models. In such embodiments, the identity verification system 130 may determine an aggregate false acceptance rate and an aggregate false rejection rate based on false acceptance rates and false rejection rates for multiple identity confidence models. Accordingly, the aggregate false acceptance rate and the aggregate false rejection rate may characterize the performance of the multiple identity confidence models collectively. For example, a combination of user-specific sensors and shared sensors in an enterprise system collect characteristic data $D_t$ for a requesting target user i, where $D_t = \{d_{0t}, d_{1t}, d_{2t} \ldots d_{mt}\}$. If $A(u_i, D_t)$ represents the authentication result of applying data $D_t$ for the requesting target user $u_i$, and $p(u_i, D_t)$ is the probability of the data $D_t$ coming from the requesting target user $u_i$, the shared sensor module 1420 may use Equations (30) to (33) to compute a false acceptance rate according to Equation (20) and a false rejection rate according to Equation (21) for the combination for sensors.

$$TP = \Sigma_{u_i, D_t} p(u_i, D_t) A(u_i, D_t) 1_{0:\beta 1}(\alpha) \quad (30)$$

$$FP = \Sigma_{u_i, D_t} (1 - p(u_i, D_t)) A(u_i, D_t) 1_{0:\beta 2}(\alpha) \quad (31)$$

$$TN = \Sigma_{u_i, D_t} (1 - p(u_i, D_t))(1 - A(u_i, D_t)) 1_{0:\beta 2}(\alpha) \quad (32)$$

$$FN = \Sigma_{u_i, D_t} p(u_i, D_t)(1 - A(u_i, D_t)) 1_{0:\beta 1}(\alpha) \quad (33)$$

Depending on the performance of an individual identity confidence model or an enterprise system as a whole, the optimization module 1430 may adjust one or more parameters of one or more identity confidence models to improve or maintain their performance. Alternatively, the optimization module 1430 may request a new set of training data to retrain an identity confidence model. In some embodiments, when an identity confidence model is performing at a below threshold level, an operator may receive a notification to manually adjust or supervise the retraining of the identity confidence model.

The techniques described above for evaluating a combination of identity confidence models may be extended to characteristic data processed by the user-specific sensor module 1410 depending on the user operating the identity verification system of an enterprise.

Proximity Based Identity Modulation

In implementations where a requesting device operated by an authenticating target user and an authentication device are separated by a distance, the proximity-based identity modulator 540 of the identity computation module 230 modulates identity confidence values before inputting the identity confidence values to the identity confidence model(s) 510. As described herein, a requesting device refers to a computing device configured to request access to an operational context or a secured asset. As described herein, an authenticating device refers to a computing device configured to authenticate target users requesting access to an operational context, for example a phone configured for biometric authentication. In one embodiment, the operational context is a room secured by a locked door and the authenticating device is a badge reader configured to open the door. Sensors of the identify verification system 130 communicatively coupled or physically mounted to the authenticating device measure the strength of signals, for example radio signals, emitted by the requesting device. The proximity-based identity modulator 540 may apply the techniques described herein to signals transmitted from the requesting device to the authenticating device and signals transmitted from the authenticating device to the requesting device. The proximity-based identity modulator 540 compares the measured signals to historical or calibration signal measurements to modulate whether to grant access to a user.

In some embodiments, the proximity-based identity modulator 540 may combine signals communicated from a requesting device to an authenticating device with signals communicated from the authenticating device to the requesting device to improve the accuracy of the system. In some embodiments, the proximity-based identity modulator 540 calibrates signal measurements to calibrate an authenticating computing device in an operational context before using the authenticating computing device. In some embodiments, the identity computation module 230 applies the techniques described herein to deny access or secure an asset when a requesting target user has moved a distance away from the operational context. For example, if a requesting target user operates a secured computer before walking away from the computer, the identity computation module 230 locks the computer when the requesting computing device is a threshold distance away from the computer or based on previous patterns.

Figure 15:
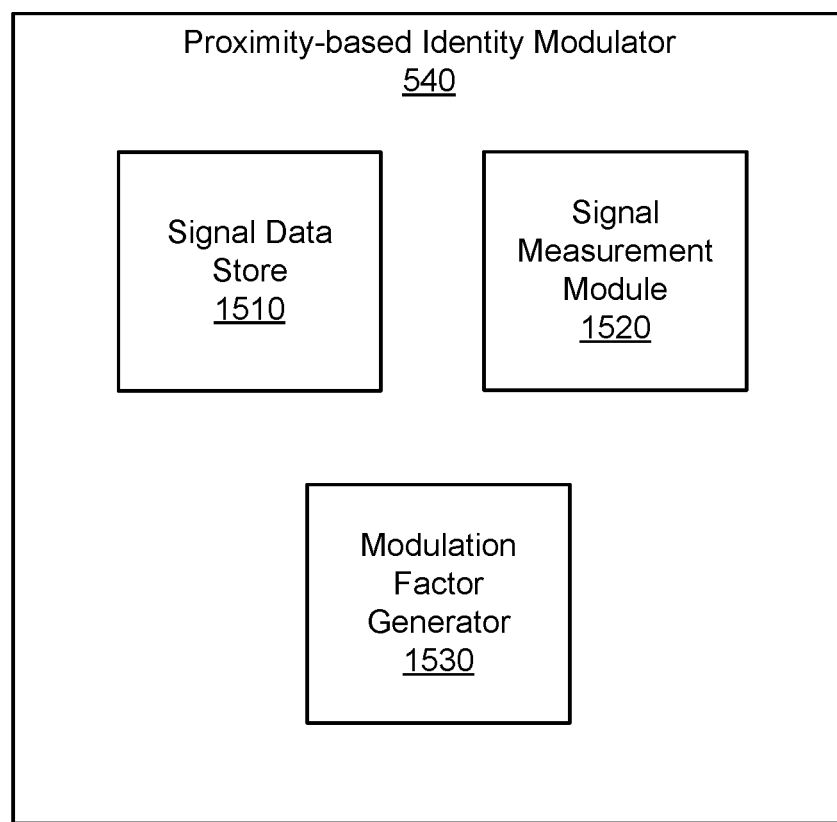
FIG. 15 is a block diagram of the system architecture of the proximity-based identity modulator, according to one embodiment.

FIG. 15 is a block diagram of an example system architecture of the proximity-based identity modulator 540, according to one embodiment. The proximity-based identity modulator 540 includes a signal data store 1510, a signal measurement module 1520, and a modulation factor generator 1530. In some embodiments, the proximity-based identity modulator 540 includes additional modules or components. In some embodiments, the functionality of components in the proximity-based identity modulator 540 may be performed by other components of the identity computation module 230. For the sake of description, techniques implemented by the proximity-based identity modulator 540 are described with reference to embodiments where signals originate from a requesting device and are measured by an authenticating device. However, a person of ordinary skill in the art would appreciate that these techniques could be applied to embodiments where signals originate from an authenticating device and are measured by a requesting device or a combination of the two.

The signal data store 1510 stores historical signals and patterns of signals labeled as granting access to the operational context or asset secured by the authenticating target user. The modulator 540 evaluates the past patterns stored in the signal data store 1810, for example by applying statistical analyses, changepoint techniques, machine learning and/or deep learning methods, or a combination thereof.

The signal measurement module 1520 measure signals transmitted from the requesting computing device for a time t prior to a user's successful authentication during a duration I. For example, in an implementation where I is defined as two weeks and t is defined as 10 seconds, the signal measurement module 1520 measures 10 seconds of each signal recorded prior to a successful authentication during the preceding two weeks. As described herein, the t duration is referred to as the "candidate time" and the signal collected during the duration is referred to as a "candidate signal." The signal measurement module 1520 receives a signal originating from an authenticating computing device and measured at a requesting computing device.

In some embodiments, the signal measurement module 1520 may apply one or more pre-processing or filtering steps to the signal before measuring the signal. The signal measurement module 1520 may linearize the signal by processing the signal in linear units, remove noise from the signal using various filtering techniques (e.g., Chebyshev filters, Butterworth filters, or Bessel filters), remove outliers by discarding samples, or a combination thereof. Similarly, the signal measurement module 1520 may apply the same or different pre-processing of filtering steps to signals measured during past successful authentications.

In some embodiments, the signal data store 1510 stores measured signals in a collection of signals $U=\{u_0, u_1, \ldots u_z\}$ where each $u_i$ is a sequence of numbers representing the signal strength and the time period when each signal of the collection was measured. The signal measurement module 1520 groups measured signals into patterns of access, for example using changepoint detection techniques. As described herein patterns of access describe how a requesting target user requested access to an operational context, for example their location, their direction of movement, and their speed of movement. The signal measurement module 1520 continuously monitors a signal S and applies changepoint detection techniques (e.g., Bayesian online changepoint detection, Pruned Exact Linear Time, or any other change point detection algorithms) to the signal to identify changes in the state of the authenticating computing device. When a requesting target user requests authentication based on their proximity to an operational context, the beginning of the sample set of measured signals is identified using a changepoint algorithm and the end of the sample set (comprising n samples) is identified as the point at which authentication was requested. Based on the detected change point, the signal measurement module 1520 divides the signal S into different signal sets—$S_0, S_1 \ldots S_n$ such that $S_i=\{r_{i0}, r_{i1}, \ldots r_{i(k-1)}\}$ and $S_{i+1}=\{r_{(i+1)0} \ldots r_{(i+1)(l-1)}\}$, where $r_{i(k-1)}$ and $r_{(i+1)0}$ represent the same point in the signal S and the time instances corresponding to the above data points are $T_i=\{t_{i0}, t_{i1} \ldots t_{i(k-1)}\}$. $S_i$ represents the candidate signal, $T_i$ represents the candidate time, and $r_{ij}$ represents the signal strength as well as the time when the signal was measured. In alternate embodiments, $r_{i(k-1)}$ and $r_{(i+1)0}$ represent adjacent points in the signal S.

The signal measurement module 1520 monitors past successful authentications of the requesting target user and represents the timestamp of each successful authentication as $A=\{a_0, a_1, \ldots a_z\}$. For each $a_i \in A$, the signal measurement module 1520 identifies $S_{l_i}$ such that there exists a $T_{l_i}$ such that $t_{l_i 0} \leq a_i < t_{l_{(k-1)}}$. As discussed herein, $S_l$ represents a collection of signals collected for a set of past successful authentications where $S_{l_i}$ represents an individual signal in the collected set. For example, if a requesting target user is granted access to an operational context at 4 p.m., the signal set $S_l$ includes signal measurements collected between 3:58 p.m. and 4:02 p.m. When the requesting target user attempts access the operational context in the future, the candidate signal is compared against the subset for a match to authenticate the requesting target user. Accordingly, $S_l$ may be defined as $S_l=\{S_{l_0}, S_{l_1}, \ldots S_{l_z}\}$. In some embodiments, the signal measurement module 1520 may additionally identify segments measured prior to $S_{l_i}$ where $T_{l-1}=\{S_{l-1_0}, S_{l-1_1}, \ldots S_{l-1_z}\}$, so the segment $T_{l-1_i}$ is measured immediately before $S_{l_i}$. The signal measurement module 1520 concatenates the elements in $T_{l-1}$ and $S_l$ in a pairwise fashion. The concatenated vectors are stored in $S_l$. Accordingly, the signal measurement module 1520 may similarly group signals measured from past successful authentications into patterns of access using the techniques discussed above.

For each $S_{l_i} \in S_l$, the signal measurement module 1520 determines $\mu_{l_i}$ and $\sigma_{l_i}$, so $M_l=\{\mu_{l_0}, \mu_{l_1}, \ldots, \mu_{l_z}\}$ and $\Sigma_l=\{\sigma_{l_0}, \sigma_{l_1}, \ldots \sigma_{l_z}\}$ and $N_l=\{n_{l_0}, n_{l_1}, \ldots n_{l_z}\}$ here $n_{l_i}$ is the number of entries in $S_{l_i}$, where $M_l$ represents the mean strength of the signals measured during previous successful authentications, $\Sigma_l$ represents the standard deviation of the signals measured during previous successful authentications, and $N_l$ represents the number of signals values measured during previous authentications. In alternate embodiments, the signal measurement module 1520 may apply any suitable alternate algorithm to further break the $S_{l_i}$ at each authentication points.

In some embodiments, the modulation factor generator 1530 may consider the mean ($\mu_i$) and standard deviation ($\sigma_i$) for members of $S_l$ to calculate the mean ($\mu_{new}$) and standard deviation ($\sigma_{new}$) according to Equations (34), (35), and (36):

$$\mu_{new} = \frac{m\mu + n\mu_i}{n+m} \quad (34)$$

$$\sigma_{new} = \sqrt{\frac{m\sigma^2 + n\sigma_i^2 + m(\mu_{new}-\mu)^2 + n(\mu_{new}-\mu_i)^2}{n_{new}}} \quad (35)$$

$$n_{new} = n + m \quad (36)$$

In alternate embodiments, $\sigma_{new}$ may be determined using Welford's algorithm.

In addition to the techniques discussed above, the signal measurement module 1520 may cluster and combine entries within $S_l$ by computing the means of two entries $\mu_{l_i}$ & $\mu_{l_j}$. In some embodiments, to access a secured operational context, a requesting target user may move towards the authenticating computing device from the left, the right, or both. For example, over a two-month period, a user may request access to an operational context with signals entering from the right 30 times and signals entering from the left 20 times. In such circumstances, the signal measurement module 1520 may cluster signal measurements into a first cluster of signals measured when a requesting target user enters from the right and a second cluster of signals measured when a requesting target user enters from the left. The signal measurement module 1520 may identify two entries to be combined based on whether the two computed means satisfies an experimentally chosen threshold $\epsilon$, for example according to Equation (37):

$$|\mu_{l_i} - \mu_{l_j}| < \epsilon \tag{37}$$

If the threshold $\epsilon$ is satisfied, the signal measurement module 1520 may combine $\mu_{l_i}$ and $\mu_{l_j}$ according to Equations (38), (39), and (40):

$$\mu_{l_r} = \frac{n_{l_i}\mu_{l_i} + n_{l_j}\mu_{l_j}}{n_{l_i} + n_{l_j}} \tag{38}$$

$$\sigma_{l_r} = \sqrt{\frac{n_{l_i}\sigma_{l_i}^2 + n_{l_j}\sigma_{l_j}^2 + n_{l_i}(\mu_{l_r} - \mu_{l_i})^2 + n_{l_j}(\mu_{l_r} - \mu_{l_j})^2}{n_{l_i} + n_{l_j}}}, \tag{39}$$

$$n_r = n_{l_i} + n_{l_j}. \tag{40}$$

where $M_r$, $\Sigma_r$, and $N_r$ are the resulting set of $\mu_{r_i}$, $\sigma_{r_i}$, and $n_{r_i}$. In implementations where the signal measurement module 1520 does not perform the above clustering technique, the signal measurement module 1520 defines $M_r = M_l$, $\Sigma_r = \Sigma_l$, and $N_r = N_l$. In such implementations, $\mu$, $n$, and $\sigma$ may be combined with alternative techniques in a different embodiment.

The modulation factor generator 1530 determines a proximity-based identity modulator factor ($\phi$) by comparing signal patterns stored in the data store 1510 to a measured signal transmitted from a requesting device, which it applies to further modulate identity confidence values generated by the identity confidence model 510. The modulation factor may be a multiplier applied to modulate the identity confidence values generated by the identity confidence models 510. For example, if the motion identity confidence model 910 generates an identity confidence value C for a requesting device and the modulation factor generator 1530 computes a modulation factor $\phi$, the proximity-based identity modulator 540 may modulate the identity confidence value by scaling the identity confidence value C by the modulation factor $\phi$. In an alternate embodiment, a practitioner of the art may design a different modulation technique using $\phi$ and C. In addition to, or in the alternative, the proximity-based identity modulator 540 may implement any of the techniques discussed below.

To determine a modulation factor, the modulation factor generator 1530 calculates statistical parameters including a mean ($\mu$), standard deviation ($\sigma$), and a total number of collected entries (m) based on all signals collected during the implementation of the identity verification system. In some embodiments, the modulation factor generator 1530 determines the mean and standard deviation based on all signals measured since identity verification system was first implemented in an enterprise, but in other embodiments determines those values based on data recorded during a particular preceding time period, for example two weeks. The modulation factor generator 1530 may additionally weight more recently measured signals higher than older measured signals. In some embodiments, the modulation factor is a binary value.

The modulation factor generator 1530 determines statistical metrics (e.g., $\mu$) for the candidate signal and statistical metrics for each signal measured during a past successful authentication. The modulation factor generator 1530 compares the metrics determined for the candidate signal to the metrics determine from each past successful authentication or calibration steps to determine the candidate signal matches a signal measured during a past successful authentication.

In one such embodiment, during a time interval t, the signal measurement module 1520 collects a sample set of n signals for which the modulation factor generator determines a mean $\mu_t$. If $\mu_t > \mu - (\text{offset} + \beta)$, the modulation factor generator 1530 defines the modulation factor as 1. If not, the modulation factor generator 1530 defines the modulation factor as 0.

The offset referenced above is a value calculated experimentally based on the experiences of target users over a number of samples defined by a human operator, for example m=10 samples in the candidate signal. In some embodiments, the target user experience is characterized based on target false positive and false positive rates. In alternate embodiments, the offset may be determined by applying a multiplier k to the standard deviation ($\sigma$) where k is defined experimentally.

$\beta$, referenced above, is a value defined based on the desired accuracy of the confidence evaluation module 240. $\beta$ is a function of the number of samples n measured during the candidate time t (at the time of authentication the number of samples measured could be less than the number of samples m defined by a human operator) and the desired proximity sampling accuracy p compared to the ideal solution if m samples were available. Computationally, the modulation factor generator 1530 may determine $\beta$ according to Equation (41) without making assumptions regarding statistical distributions:

$$\beta = \frac{\sigma}{\sqrt{\left(1 - \frac{p}{100}\right)}} \left( \frac{1}{\sqrt{(10)}} - \frac{1}{\sqrt{(n)}} \right) \tag{41}$$

In a particular implementation involving 99% proximity sampling accuracy from the identity confidence module 240, modulation factor generator 1530 determines $\beta$ according to Equation (42):

$$\beta = \sigma \left( \sqrt{10} - \frac{10}{\sqrt{n}} \right) \tag{42}$$

In alternate embodiments, the technique described above may be adjusted by a human operator to account for different assumptions regarding the distribution of the measured signal. In some embodiments, the proximity-based identity modulator considers the operational context being accessed when modulating identity confidence values.

The signal data store 1510 additionally receives a new set of signals v recorded over a time interval t when a requesting target user requests an authentication. In some embodiments, the signal data store 1510 may encode the signals v into a vector resembling a vector representation of the collection of signals U and compute the distance between the vectors v and U. The modulation factor generator 1530 may determine the modulation factor based on a distance between the respective vector representations of the set of signals u and the collection of signals U and convert the determined distance into a modulation factor, for example according to Equation (43) or another suitable function. In some embodiments (described herein), the modulation factor generator 1530 determines the distance between two measured signals (e.g., how closely two signals match). In alternate embodiments, the modulation factor generator 1530 determines the distance between an authenticating computing device and a requesting computing device.

$$\phi = \frac{1}{1 + e^{a \times distance - b}} \quad (43)$$

where a and b are constants. In another embodiment, if the distance exceeds a threshold value, the modulation factor $\phi$ is defined as 0, but if the distance is below the threshold value, the modulation factor is defined as 1.

The modulation factor generator 1530 may determine the distance between the vectors v and U according to Equation (44):

$$D = \text{minimum}\{\text{dist}(u_0,\upsilon), \text{dist}(u_1,\upsilon), \text{dist}(u_z,\upsilon)\} \quad (44)$$

where dist is the distance between two vectors of signal strength. In an alternate embodiment, the modulation factor generator 1530 determines an average of the lowest k dist($u_i$, $\upsilon$) where k is a constant. A person having ordinary skill in the art would appreciate that the examples described above are meant to be representative and that any other suitable technique for computing the distance between two vectors signal strength may be applied.

In another embodiment, the signal measurement module 1520 resamples the signals u and $u_t$ at a frequency f with the authentication points at the time an authentication request is received. As described herein, the resampled signals are referred to as $\upsilon_r$ and $u_{i_r}$, respectively. The modulation factor generator 1530 assigns negative values to signals collected prior to the authentication request and positive values to signals collected after the authentication request and identified $\upsilon_o$ and $u_{i_o}$, which are overlapping portions of the signals signal $u_r$ and $u_{i_r}$. If the overlapping portion of the two signals does not satisfy a threshold size, the modulation factor generator 15230 may attempt to extend the signal with the prior segment in the $u_i$, before returning a distance=∞ if the overlap duration continues to be smaller than a certain time τ. If the extended signals do satisfy the threshold overlap, the modulation factor generator 1530 may determine the distance s between the two vectors $\upsilon$ and $u_i$ according to Equations (45) and (46):

$$s = \frac{\sum_j s_j \circ \text{duration}(s_j)}{\sum_j \text{duration}(s_j)} \quad (45)$$

$$s_j = |v_o - u_{j_o}| \quad (46)$$

where the subtraction and absolute values are calculated on a term-by-term basis.

A person having ordinary skill in the art would appreciate that the examples described above are meant to be representative and that any other suitable technique for computing the distance between two vectors signal strength may be applied, for example a modified Hamming distance, Levenshtein distance, dynamic time warping techniques, and other suitable techniques may be applied.

In additional to the techniques described above, the proximity-based identity modulator 540 may use all candidate signals to compute the success patterns of the identity verification system 120. In alternate embodiments, the proximity-based identity modulator only considers data recorded during a specified preceding window of time, for example the last two weeks or assigns more recent data a higher weight than older data when determining such success patterns.

In some embodiments, the proximity-based identity modulator 540 may further consider the operational context to which a requesting target user is attempting to access when modulating identity confidence values generated by the identity confidence model. The operational context of a secured asset may be established by processing several types of signals including, but not limited to, Bluetooth signals, WiFi signals, IP address signals, GPS location signals, cellular hub signals, and atmospheric pressure signals (sensors on phone). As described herein, such signals are referred to as "context signals." Accordingly, the signal measurement module 1520 may characterize an operational context by based on a string of values identifying each context signal and a real value representing the strength of the signal. In particular, the signal measurement module 1520 characterizes the operational context at a time t as $C_t = \langle (w_{0_t}, s_{0_t}), (w_{1_t}, s_{1_t}) \ldots (w_{n_t}, s_{n_t}) \rangle$, where $w_{i_t}$ is a string of multiple values identifying the signal, and $s_{i_t}$ represents the strength of the signal (e.g., a value of "1").

The signal measurement module 1520 may segment the vector of context signals $C_t$ into context segments, for example by using changepoint detection or external events to bound each segment. As described herein, examples of an external event include a user logging into a laptop, a user starting to walk while on their phone, or a user walking down the stairs. As described herein, the signal measurement module 1520 characterizes a context segment based on the time at which segment was measured $T_j = \{i_0, i_1, \ldots i_{(k-1)}\}$ and context signals measured at that time $$C_{i_j} = \langle (w_{0_{i_j}}, s_{0_{i_j}}), (w_{1_{i_j}}, s_{1_{i_j}}) \ldots (w_{n_{i_j}}, s_{n_{i_j}}) \rangle.$$

Within a segment time, the signal measurement module 1520 may aggregate context signals to improve the accuracy of the identity verification system 120. For a given operational context, the signal measurement module may measure signals belonging to various requesting target users, which may be more generally categorized into users frequenting the operational context (e.g., employees) and infrequent users in the operational context (e.g., visitors). Accordingly, the signal measurement module 1520 may aggregate signals measured at the operational context into those that are common to the operational context (e.g., employees) and those that are not.

The signal measurement module 1520 identifies context signals to be evaluated, for example those context signals present in a collected sample with a strength above a certain amount. To determine values identifying the context signal to be aggregated by generating a set of all sources of signals available during the candidate time where the signal strength was greater than a threshold ($\delta_d$), a tunable constant that may vary for different technologies. For example, the value of the threshold may be assigned a value for a BLE signal, a different value for a standard Bluetooth signal, and yet a different value for a WiFi signal. Accordingly, the signal measurement module 1520 may generate the set according to Equation (47):

$$W_i = \{w_{i_r} \mid w_{i_r} = w_{k_{i_j}} \wedge w_{k_{i_j}} \in C_{i_j} \wedge s_{k_{i_j}} > \delta_d\} \quad (47)$$

For an operational context ($C_{i_j}$), the signal measurement module 1520 generates a subset of signal sources available at the operational context and aggregates signal measurements received from those signals into a subset M. For each identified context signal source, the signal measurement module 1520 predicts a probability that the context signal will be present in an operational context according to Equation (48):

$$p_{i_r} = l/k \quad (48)$$

Where l is the number of operational contexts ($C_{i_j}$) in which the context signal ($w_{i_r}$) is present and k is the number of available operational contexts. For each operational context ($C_{i_j}$) in which $w_{i_r}$ is present, the signal measurement module 1520 determines characteristic measurements of the strength of the context signal ($s_{i_r}$), for example the mean and standard deviation of the measured signal $s_{i_r}$ as $\mu_{i_r}$ and $\sigma_{i_r}$ and aggregates the context signal into a collection of signal sources measured from the sources ($W_i$). The signal measurement module assigns the aggregated signal the probability, mean, and standard deviation corresponding to the collection of signals, creating a tuple $\delta_i = \langle W_i, P_i, M_i, \Sigma_i \rangle$. The collection of all such tuples for a context j is defined as $\Gamma_j = \{\delta_0, \delta_1 \ldots\}$ In some embodiments, the signal measurement module 1520 aggregates operational contexts across segments based on similarities between operational contexts. The signal measurement module 1520 begins by defining a set of operational contexts as $\Gamma = \{\Gamma_0, \Gamma_1, \ldots \Gamma_p\}$ and may identify a subset of sources ($X_i$) where the probability that a signal from the source $w_{i_r}$ will be present in an operational context is 100%. As described herein, "Γ" is a vector representation encoded with each signal source expected to be available at an operational context and a likelihood that a signal measurement from the signal source will be available at the operational context. The likelihood may be a probability measurement determined based on a frequency over previous measurements, a mean strength of the signal during those measurements, and a standard deviation of the signal.

The signal measurement module 1520 aggregates two subsets of signal sources $X_i$ and $X_j$ based on a comparison of the overlap between signals received from the signal sources. For example, the signal measurement module 1520 may aggregate collections of signals $\Gamma_i$ and $\Gamma_j$ if $X_i$ and $X_j$ are within a threshold percent (γ) overlap, where the threshold is determined according to Equation (49) The "||" operator below denotes the cardinality operator for a set:

$$\frac{|X_i \cap W_j|^2}{|X_i||X_j|} > \gamma \quad (49)$$

The signal measurement module may determine $W_j = W_i \cup W_j$, a weighted sum of individual probabilities is taken to compute $P_j$, and aggregate mean and standard deviations. As a result, the signal measurement module 1520 may aggregate operational contexts into a smaller number of context defined as $=\{\Gamma_0, \Gamma_1, \ldots \Gamma_a\}$ where a≤p. In alternate embodiments, the signal measurement module 1520 may consider alternative clustering contexts and/or any applicable clustering algorithms (e.g., machine-learned models).

Referring back to the techniques described above, the operational context 1350 may be used to further segment data patterns within a signal to match against other signals. For example, if a user works in two different locations A and B, the operational context may be implemented to more accurately analyze successful signal patterns. As described herein, $U = \{u_0, u_1, \ldots u_z\}$ represents the signal sequences corresponding to successful behavior when authenticating. The signal measurement module 1520 segments U into successful sub sequences based on context $\Gamma_j = \{\Gamma_0, \Gamma_1, \ldots \Gamma_a\}$ such that $U = \{U_0, U_1, \ldots U_{k-1}\}$, where $U_j = \{u_{j_0} \ldots u_{j_{k-1}}\}$ for the context $\Gamma_j$. The modulation factor generator 1530 may compute distance estimates between two vectors of signals based on the segments belonging to $U_j$ while applying the mean and standard deviations previously computed and discussed above with regards to $M_j$ and $\Sigma_j$. In alternate implementations involving context, the signal measurement module 1520 may not consider M and Σ. In such implementations, the signal measurement module 1520 may compute the mean and standard deviations, if required, may be computed as needed from the signal sequences.

In additional to the techniques described above, signal measurement module 1520 may use all context signals to characterize an operational context. In alternate embodiments, the signal measurement module 1520 only considers data recorded during a specified preceding window of time, for example the last two weeks or assigns more recent data a higher weight than older data when determining such success patterns. In addition, Γ may be frequently recomputed as a requesting target user's behavior changes by removing or adding contexts.

Figure 16A:
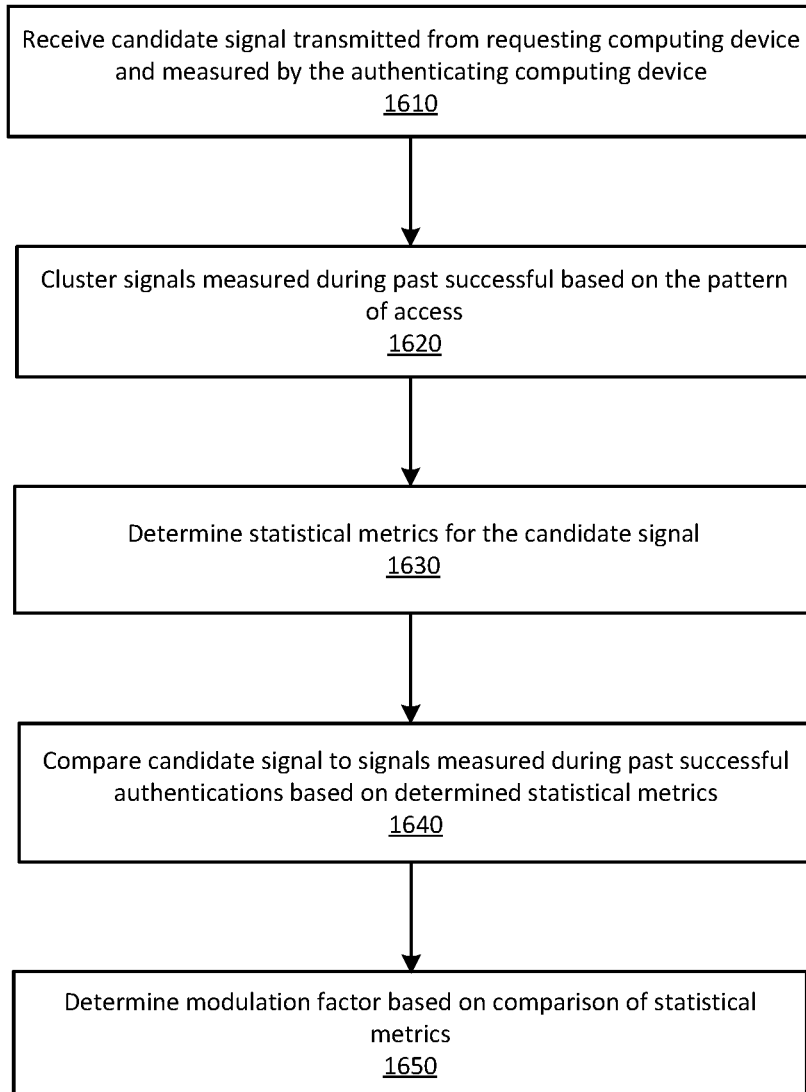
FIG. 16A illustrates a process for determining a modulation factor based on statistical metrics determined for an operational context, according to one embodiment.

FIG. 16A illustrates a process for determining a modulation factor based on statistical metrics determined for an operational context, according to one embodiment. The proximity-based identity modulator 540 receives 1610 a candidate signal transmitted from a requesting computing device and measured by an authenticating computing device. In alternate embodiments, the candidate signal may be transmitted from the authenticating computing device and received by the requesting computing device. Pre-processing and filtering techniques may be applied to the candidate signal.

Using the clustering techniques discussed above, for example changepoint detection, the proximity-based identity modulator 540 generates 1620 clusters of signals measured during past successful authentications or calibration steps representing the same pattern of access (e.g., direction from which the user moves, speed at which the user moves). Accordingly, the clustered group of signals represent signals measured during past successful authentications against which the proximity-based identity modulator 540 may compare the candidate signal. With each successful authentication, the proximity-based identity modulator 540 updates a cluster of candidate signals and derives statistical metrics, for example the metrics discussed above with regards to the signal measurement module 1520 and the modulation factor generator 1530.

Similarly, the proximity-based identity modulator 540 determines 1630 statistical metrics for the candidate signal and compares 1640 the statistical metrics determined for the candidate signal to those determined for a cluster of signals measured during past successful authentications. Based on the comparison, the proximity-based identity modulator 540 determines the probability that the candidate signal is a member of the cluster of successful authentication patterns and determines 1650 a modulation factor.

In one embodiment discussed above, the proximity-based identity modulator 540 considers whether $\mu_i > \mu - (\text{offset} + \beta)$ and, if so, proximity-based identity modulator 540 defines the modulation factor as 1. If not, the proximity-based identity modulator 540 defines the modulation factor as 0. In alternate embodiments where the proximity-based identity modulator 540 considers an operational context of a secured asset, the proximity-based identity modulator 540 determines statistical metrics ($\mu_i$) for each type of signal known to be available at the operational context and considers whether $\mu > \mu_i - (\text{offset} + \beta)$. If so, the proximity-based identity modulator 540 defines the modulation factor as 1. If not, the proximity-based identity modulator 540 defines the modulation factor as 0.

Figure 16B:
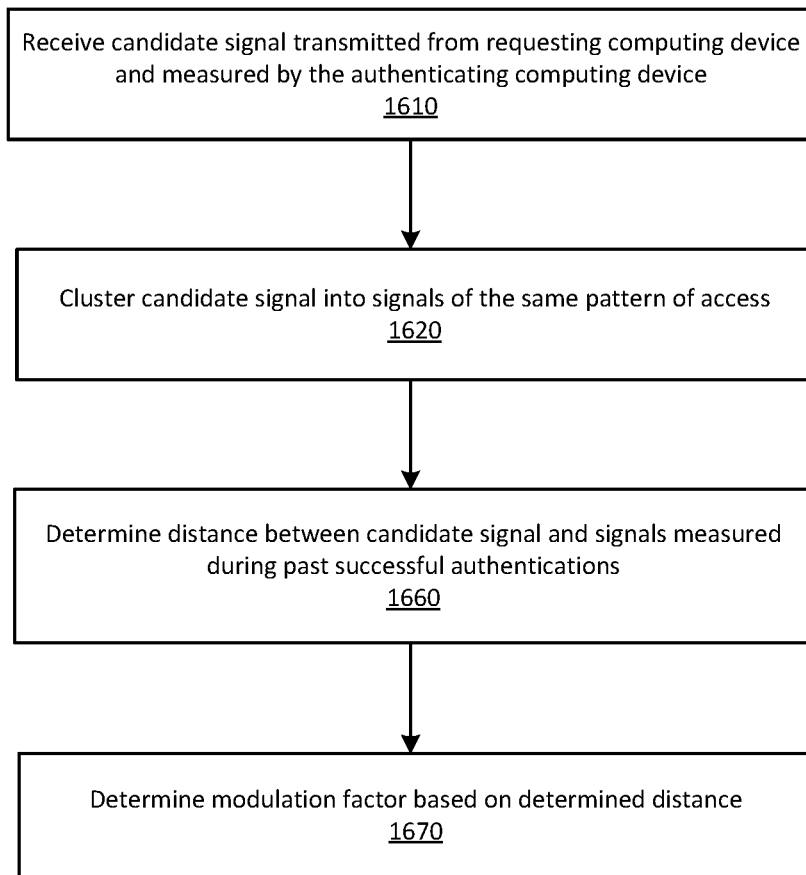
FIG. 16B illustrates a process for determining a modulation factor based on statistical the distance between two signal measurements, according to one embodiment.

FIG. 16B illustrates a process for determining a modulation factor based on statistical the distance between two signal measurements, according to one embodiment. Recalling steps 1610 and 1620 of FIG. 16, the proximity-based identity modulator 540 may compare the candidate signal to a signal measured during a past successful authentication or calibration steps by determining 1660 the distance between the candidate signal the past measured signal using the techniques discussed above, which characterizes how closely the two signals match. Accordingly, the proximity-based identity modulator may determine 1670 the modulation factor using the techniques discussed above.

Risk Estimation Based on Operational Contexts

Recalling the processes and techniques discussed above, when a requesting target user request access to a secured asset, the identity verification system 130 determines the probability that the identity of a target user matches the identity of the authentication credentials being used. To do so, the identity computation module 230 determines an identity confidence value representing a likelihood that a requesting target user's identity matches that of the authenticating target user and the confidence evaluation module 240 determine a risk factor associated with allowing the requesting target user access to the operational context. In a first embodiment, the confidence evaluation module 240 adjusts an identity confidence value based on the determined risk factors according to Equation (3). In a second embodiment, the confidence evaluation module 240 adjusts an identity confidence value based on the determined risk factors according to Equations (16)-(19). In a third embodiment, the confidence evaluation module 240 adjusts an identity confidence value based on the determined risk factors according to Equations (10)-(13). If the adjusted identity confidence value exceeds a threshold confidence required for access, the confidence evaluation module 240 grants access to the requesting target user.

In some embodiments, the confidence evaluation module 240 characterizes risk parameters in terms of a risk or risk tolerance assigned to an operational context. Within an enterprise, the confidence evaluation module 250 may separate operational contexts into "identifiable contexts" and "non-identifiable contexts." For identifiable contexts, an operator may manually identify or label the operational context, for example "office," "conference room 1," "home," or "local coffee house" and assign a trust estimation to each operational context. Enterprises may choose to implement the identity verification system 130 with no initially identified operational contexts while adding identified operational contexts after implementation, or with operational contexts initially identified manually by an operator (e.g., an operator or user confirms if they are working at home and whether the system should consider that context as their domicile). In other embodiments, the techniques disclosed herein, may be implemented to assign risk parameters to particular target users.

The confidence evaluation module 250 may additionally categorize non-identifiable contexts into a first set of contexts where the number of context signals ($w_i$) having a probability ($p_i$) less than a threshold value ($\delta_c$) is below a threshold number ($\eta$), a second set of contexts where the number of context signals ($w_i$) having a probability ($p_i$) less than a threshold value ($\delta_c$) is above a threshold number ($\eta$), and a third set of contexts where no information is known about the contexts. The confidence evaluation module 250 may assign all contexts in an enterprise a default trust estimate ($\rho_D$) before determining trust estimates for specific operational contexts. In other embodiments, the confidence evaluation module 250 determines the trust estimate for a particular operational context ($\rho_i$) based on the relative probability of compromise of a device in a context (p), for example according to Equation (50):

$$\rho = 1 - p \tag{50}$$

Accordingly, $\rho$ is an estimate (ranging between 0 and 1) of the probability that a device has not been compromised in an operational context. For each confidence evaluation model may encode a vector representation of each operational context with the trust estimate for specific operational contexts and other context signal characteristics discussed above, for example $\Gamma_i = \langle W_i, P_i, M_i, \Sigma_i, \rho_t \rangle$. Whereas $W_L$, $P_i$, $M_i$, and $\Sigma_i$ are sequences, $\rho_i$ is a single number for the context $\Gamma_i$.

Figure 17:
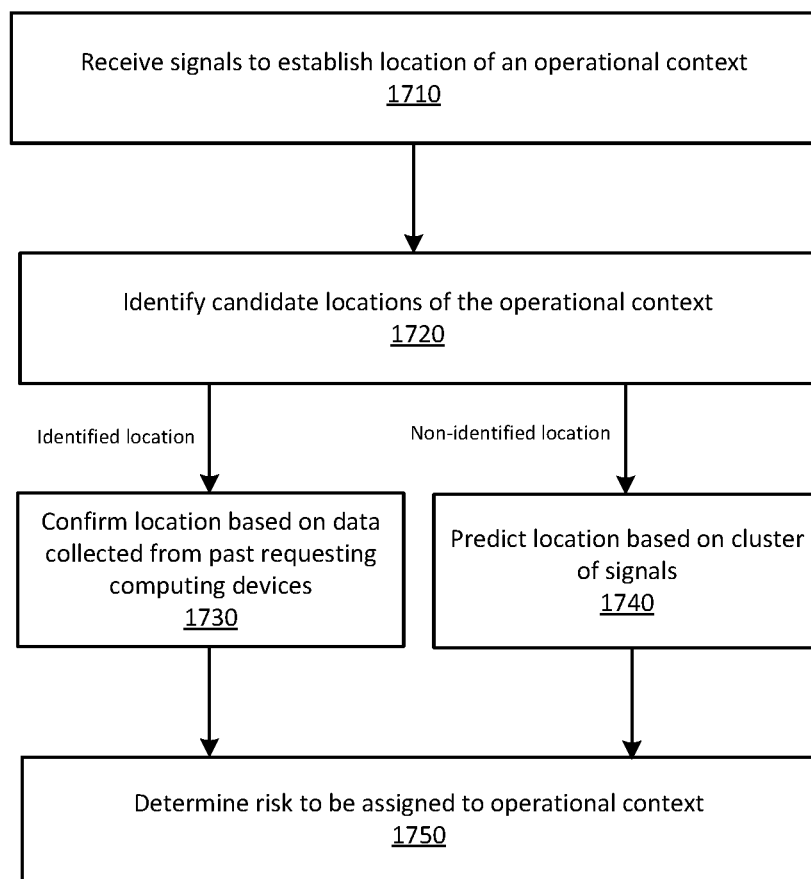
FIG. 17 illustrates a process for determining the risk assigned an operational context, according to one embodiment.
Figure 18:
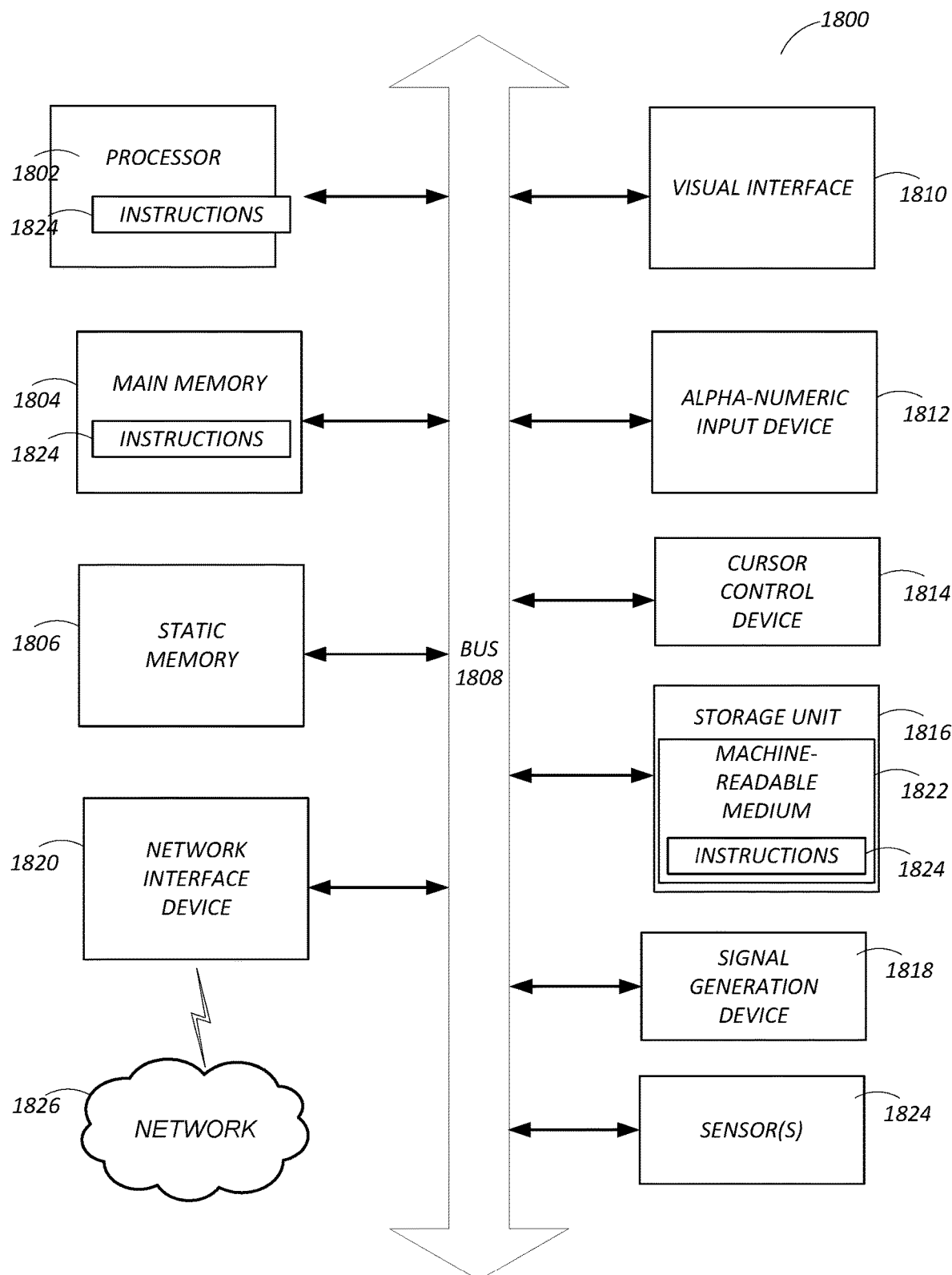
FIG. 18 is a block diagram illustrating components of an example machine able to read instructions from a machine-readable medium and execute them in a processor (or controller), according to one embodiment.

FIG. 17 illustrates a process for determining the risk assigned an operational context. When the identity computation module 230 receives an authentication request, the module 230 receives 1710 signals transmitted at the operational context to establish a location of an operational context. The identity computation module 230 compares the context information encoded in the signal at the time of the authentication request and modulates the risk accordingly. In one embodiment, a requesting target user requests access to an operational context F and the identity computation module 230 receives a context signal $C_i = \langle W_{ci}, P_{ci}, M_{ci}, \Sigma_{ci} \rangle$. As signals are collected and assigned to verified operational contexts, the identity computation module may generate, and update clusters of signals measured at the same operational context or a similar type of operational contexts. The identity computation module 230 may compare received signal to clusters of historical signals collected from known operational contexts to identify 1720 a subset of candidate operational contexts, each of which is assigned a risk parameter (or a risk score), a source, and a strength measurement. Accordingly, the confidence evaluation module 540 determines the location of an operational context corresponding to the received context signal. The subset of candidate operational contexts may include a first subset of identified context and a second set of non-identified contexts, each of were previously assigned risk parameters. Where the operational context is an identified location, the confidence evaluation module 540 confirms 1730 the location based on the cluster of signals matching the received signal and assigns a risk parameter of the confirmed location to the received context signal. Based on the confirmed 1730 or predicted 1740 location, the confidence evaluation module determines 1750 the risk tolerance or risk factors for the operational context using the techniques discussed above. For example, where the confirmed location is an identified context, the confidence evaluation module 540 assigns the confirmed location a risk parameter determined for the identified context. Where the predicted location is a non-identified context, the confidence evaluation module 540 assigns the predicted location a risk parameter determined based on the level of similarity between the context signal and the cluster of historical signals.

First, the identity computation module 230 determines a level of similarity between the received context signal and a historical context signal. In one embodiment, the identity computation module 230 identifies a secondary operational context (e.g., $X_j$ in $\Gamma$) that most closely matches the operational context of the authentication request (the "primary operational context") by determining a matching coefficient $\theta$ between each secondary operational context and the primary operational context and identifying a matching coefficient that maximizes $$\frac{|X_j \cap W_{ci}|}{|X_j|}.$$

If the determined matching coefficient is less than a threshold value, the trust estimate for the primary operational context is defined as 0, implying that there is no match between the primary operational context and the second operational context. In such instances, the confidence evaluation module 250 maintains the default trust estimate ($\rho_D$) and adjusts the default trust estimate by the risk parameter determined for an operational context. In some embodiments where the matching coefficient is greater than the threshold value, the resulting match coefficient for authentication may be scaled by a multiplier $\xi$ less than 1.

Given the value of the matching coefficient $\theta$, the confidence evaluation 250 determines a risk parameter $\zeta$ for the operational context according to Equation (52):

$$\zeta = \frac{1}{\rho_D + (\rho_j - \rho_D)\theta} \quad (52)$$

The determined risk parameter $\zeta$ may be implemented in the embodiments and techniques discussed above with regards to Equations (16)-(19) to adjust or determine a match probability of the operational context.

In an alternate embodiment, the match probability module 220 adjusts the conditional probability distribution of an operational context based on operational context measurements including p, $\theta$, $FMR_{k,l}$, and $FNMR_{k,l}$. In such embodiments, Equations (16) to (19) may be rewritten as Equations (53) to (57):

$$\text{Risk}(f, \theta, \rho_j, \rho_D) = (f-0.5)(\rho_D + (\rho_j-\rho_D)\theta) + 0.5 \quad (53)$$

$$\text{Scenario 1: } CPD = 1 - \text{Risk}(FNMR_{k,l}, \theta, \rho_j, \rho_D) \quad (54)$$

$$\text{Scenario 2 } CPD = \text{Risk}(FMR_{k,l}, \theta, \rho_j, \rho_D) \quad (55)$$

$$\text{Scenario 3: } CPD = \text{Risk}(FNMR_{k,l}, \theta, \rho_j, \rho_D) \quad (56)$$

$$\text{Scenario 4: } CPD = 1 - \text{Risk}(FMR_{k,l}, \theta, \rho_j, \rho_D) \quad (57)$$

In addition to the techniques discussed above, a person having ordinary skill in the art would appreciate that the risk for an operational context could be determined using any alternate method, for example by computing the prior probability of a compromised device in a Bayesian estimation instead of modifying the CPD. Accordingly, $\rho = \rho_D + (\rho_j - \rho_D)\theta$, is the multiplier applied to the prior probability that the device is in possession of the user. Accordingly, if the previous prior probability for the device being in possession of the user is $\omega$, then the new prior probability is $\omega\rho$. In embodiments where the prior probability is applied in Bayesian Estimation using algorithms like Loopy Belief Propagation, or Clique Tree Algorithm, the confidence evaluation module 250 may implement $\rho$ to modulate the prior probability.

Computing Machine Architecture

FIG. 15 is a block diagram illustrating components of an example machine able to read instructions from a machine-readable medium and execute them in a processor (or controller). Specifically, FIG. 15 shows a diagrammatic representation of a machine in the example form of a computer system 1500 within which instructions 1524 (e.g., software) for causing the machine to perform any one or more of the processes or (methodologies) discussed herein (e.g., with respect to FIGS. 1-15) may be executed. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment. It is noted that some or all of the components described may be used in a machine to execute instructions, for example, those corresponding to the processes described with the disclosed configurations.

The machine may be a server computer, a client computer, a personal computer (PC), a tablet PC, a set-top box (STB), a personal digital assistant (PDA), a cellular telephone, a smartphone, a web appliance, an IoT device, a wearable, a network router, switch or bridge, or any machine capable of executing instructions 1524 (sequential or otherwise) that specify actions to be taken by that machine. Further, while only a single machine is illustrated, the term "machine" shall also be taken to include any collection of machines that individually or jointly execute instructions 1524 to perform any one or more of the methodologies discussed herein.

The example computer system 1500 includes a processor 1802 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1804, and a static memory 1806, which are configured to communicate with each other via a bus 1808. The computer system 1500 may further include visual display interface 1810. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1810 may include or may interface with a touch enabled screen. The computer system 1800 may also include alpha-numeric input device (e.g., a keyboard or touch screen keyboard), a cursor control device 1814 (e.g., a mouse, a trackball, a joystick, a motion sensor, or other pointing instrument), a storage unit 1816, a signal generation device 1818 (e.g., a speaker), and a network interface device 1820, which also are configured to communicate via the bus 1808. It is noted that the example computer system 1800 need not include all the components but may include a subset.

The storage unit 1816 includes a machine-readable medium 1822 on which is stored instructions 1824 (e.g., software) embodying any one or more of the methodologies or functions described herein. The instructions 1824 (e.g., software) may also reside, completely or at least partially, within the main memory 1804 or within the processor 1802 (e.g., within a processor's cache memory) during execution thereof by the computer system 1800, the main memory 1804 and the processor 1802 also constituting machine-readable media. The instructions 1824 (e.g., software) may be transmitted or received over a network 1826 via the network interface device 1820.

While machine-readable medium 1822 is shown in an example embodiment to be a single medium, the term "machine-readable medium" should be taken to include a single medium or multiple media (e.g., a centralized or distributed database, or associated caches and servers) able to store instructions (e.g., instructions 1824). The term "machine-readable medium" shall also be taken to include any medium that is capable of storing instructions (e.g., instructions 1824) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed identity verification system 130 enables enterprise systems to track and evaluate a user's access to an operational context in real-time. Compared to conventional systems which determine a user's access at a single point in time, the described identity verification system continuously verifies a user's identity based on characteristic data recorded by a mobile device or a combination of other sources. Because characteristics of a user's movement and activities are unique to individual users, the identity verification system 130 is able to accurately verify a user's identity with varying levels of confidence. Additionally, by leveraging characteristic data recorded for a user, the identity verification system 130 may not be spoofed or hacked by someone attempting to access the operational context under the guise of another user's identity. Moreover, by continuously comparing a confidence identity value for a user to a threshold specific to an operational context, the enterprise system may revoke or maintain a user's access.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for systems and a process for confirming an identity based on characteristic data received from various sources through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A non-transitory computer-readable medium comprising stored computer-readable instructions that, when executed by a processor, cause the processor to:
   receive a candidate signal transmitted from a computing device located near a secured asset, wherein the computing device transmits the signal in response to a target user requesting access to the secured asset;
   compare the candidate signal to a cluster of signals measured during past successful authentications by the computing device to determine a modulation factor, wherein comparing the candidate signal to a cluster of signals comprises comparing one or more statistical metrics for the candidate signal to one or more statistical metrics for the cluster of signals, the one or more statistical metrics of the candidate signal comprising a mean strength of the candidate signal and the one or more statistical metrics of the cluster of signals comprising a mean strength of the cluster of signals;

determine a match probability for the target user based on the determined modulation factor, wherein the match probability represents a likelihood that an identity of the requesting target user matches an authenticating identity associated with access credentials recorded at the secured asset; and grant the requesting target user access to the secured asset in response to determining that the match probability is greater than a security threshold.

2. The non-transitory computer-readable medium of claim 1, wherein the instructions further comprise instructions that, when executed, cause the processor to:

access a plurality of signals measured during past successful authentications by the target user; and generate one or more clusters of signals from the plurality of signals measured during past successful authentications, wherein each cluster of the one or more clusters represents a pattern of access to the secured asset.

3. The non-transitory computer-readable medium of claim 1, wherein the instructions for comparing the candidate signal to the cluster of signals further comprises instructions that, when executed, cause the processor to:

determine one or more statistical metrics for the candidate signal; and determine one or more statistical metrics for the cluster of signals.

4. The non-transitory computer-readable medium of claim 3, wherein the instructions further comprise instructions that, when executed, cause the processor to:

determine an operational context of the secured asset;

identify one or signal sources available at the secured asset based on the operational context; and for each signal source available at the secured asset, determine one or more statistical metrics for signals received from the signal source during past successful authentication.

5. The non-transitory computer-readable medium of claim 1, wherein the instructions for comparing the candidate signal to the cluster of signals further comprises instructions that, when executed, cause the processor to:

encode a vector representation of the candidate signal;

encode a vector representation of each signal of the cluster of signals; and determine a distance between the vector representation of the candidate signal and the vector representation of each signal of the cluster of signals to determine the candidate signal matches the signal of the cluster of signals.

6. The non-transitory computer-readable medium of claim 1, wherein the instructions further comprise instructions that, when executed, cause the processor to:

deny the target user access to the secured asset in response to determining the match probability is less than a threshold assigned to the security threshold; and request a secondary authentication mechanism verify the identity of the target user.

7. A system comprising:

a computing device located near a secured asset, wherein the computing device transmits a candidate signal in response to a target user requesting access to the secured asset; and a non-transitory computer-readable medium comprising stored computer-readable instructions that, when executed by a processor, cause the processor to:

receive the candidate signal transmitted from the computing device;

compare the candidate signal to a cluster of signals measured during past successful authentications by the computing device to determine a modulation factor, wherein comparing the candidate signal to a cluster of signals comprises comparing one or more statistical metrics for the candidate signal to one or more statistical metrics for the cluster of signals, the one or more statistical metrics of the candidate signal comprising a mean strength of the candidate signal and the one or more statistical metrics of the cluster of signals comprising a mean strength of the cluster of signals;

determine a match probability for the target user based on the determined modulation factor, wherein the match probability represents a likelihood that an identity of the requesting target user matches an authenticating identity associated with access credentials recorded at the secured asset; and grant the requesting target user access to the secured asset in response to determining that the match probability is greater than the operational a security threshold.

8. The system of claim 7, wherein the instructions further comprise instructions that, when executed, cause the processor to:

access a plurality of signals measured during past successful authentications by the target user; and generate one or more clusters of signals from the plurality of signals measured during past successful authentications, wherein each cluster of the one or more clusters represents a pattern of access to the secured asset.

9. The system of claim 7, wherein the instructions for comparing the candidate signal to the cluster of signals further comprises instructions that, when executed, cause the processor to:

determine one or more statistical metrics for the candidate signal; and determine one or more statistical metrics for the cluster of signals.

10. The system of claim 9, wherein the instructions further comprise instructions that, when executed, cause the processor to:

determine an operational context of the secured asset;

identify one or signal sources available at the secured asset based on the operational context; and for each signal source available at the secured asset, determine one or more statistical metrics for signals received from the signal source during past successful authentication.

11. The system of claim 9, wherein the instructions for comparing the candidate signal to the cluster of signals further comprises instructions that, when executed, cause the processor to:

encode a vector representation of the candidate signal;

encode a vector representation of each signal of the cluster of signals; and determine a distance between the vector representation of the candidate signal and the vector representation of each signal of the cluster of signals to determine the candidate signal matches the signal of the cluster of signals.

12. The system of claim 9, wherein the instructions further comprise instructions that, when executed, cause the processor to:

deny the target user access to the secured asset in response to determining the match probability is less than the security threshold; and
request a secondary authentication mechanism verify the identity of the target user.

13. A system comprising:
a computing device located near a secured asset, wherein the computing device transmits a candidate signal in response to a target user requesting access to the secured asset;
a signal measurement module configured to receive the candidate signal transmitted from the computing device;
a modulation factor generator configured to compare the candidate signal to a cluster of signals measured during past successful authentications by the computing device to determine a modulation factor, wherein comparing the candidate signal to a cluster of signals comprises comparing one or more statistical metrics for the candidate signal to one or more statistical metrics for the cluster of signals, the one or more statistical metrics of the candidate signal comprising a mean strength of the candidate signal and the one or more statistical metrics of the cluster of signals comprising a mean strength of the cluster of signals; and
a confidence evaluation module configured to:
determine a match probability for the target user based on the determined modulation factor, wherein the match probability represents a likelihood that an identity of the requesting target user matches an authenticating identity associated with access credentials recorded at the secured asset; and
grant the requesting target user access to the secured asset in response to determining that the match probability is greater than a security threshold.

14. The system of claim 13, wherein the signal measurement module is configured to:
access a plurality of signals measured during past successful authentications by the target user; and
generate one or more clusters of signals from the plurality of signals measured during past successful authentications, wherein each cluster of the one or more clusters represents a pattern of access to the secured asset.

15. The system of claim 13, wherein the signal measurement module is configured to:
determine one or more statistical metrics for the candidate signal; and
determine one or more statistical metrics for the cluster of signals.

16. The system of claim 15, wherein the signal measurement module is configured to:
determine an operational context of the secured asset;
identify one or signal sources available at the secured asset based on the operational context; and
for each signal source available at the secured asset, determine one or more statistical metrics for signals received from the signal source during past successful authentication.

17. The system of claim 13, wherein the modulation factor generator is configured to:
encode a vector representation of the candidate signal;
encode a vector representation of each signal of the cluster of signals; and
determine a distance between the vector representation of the candidate signal and the vector representation of each signal of the cluster of signals to determine the candidate signal matches the signal of the cluster of signals.

18. The system of claim 13, wherein the confidence evaluation is configured to:
deny the target user access to the secured asset in response to determining the match probability is less than the security threshold; and
request a secondary authentication mechanism verify the identity of the target user.

* * * * *